(12) United States Patent
Chun et al.

(10) Patent No.: US 6,381,277 B1
(45) Date of Patent: Apr. 30, 2002

(54) SHAPED INFORMATION CODING DEVICE FOR INTERLACED SCANNING VIDEO AND METHOD THEREFOR

(75) Inventors: Sung Moon Chun, Kyoungki-do; Dong Kyoo Shin; Joo Hee Moom, both of Seoul; Jin Hak Lee, Taejon-si, all of (KR)

(73) Assignee: Hyundai Electronics Ind. Co, Ltd., Kyoungk-do (KR)

( * ) Notice: Subject to any disclaimer, the term of this patent is extended or adjusted under 35 U.S.C. 154(b) by 0 days.

(21) Appl. No.: 09/209,955

(22) Filed: Dec. 11, 1998

(30) Foreign Application Priority Data

Dec. 12, 1997 (KR) ............................. 97-68377
Feb. 3, 1998 (KR) ............................. 98-2986

(51) Int. Cl.⁷ ................................. H04N 7/12
(52) U.S. Cl. ................................. 375/240.12
(58) Field of Search ................. 382/232, 236, 382/243; 375/240, 240.12, 240.13, 240.16, 240.08

(56) References Cited

U.S. PATENT DOCUMENTS

| | | | |
|---|---|---|---|
| 5,428,693 A | 6/1995 | Murakami et al. ......... 382/232 |
| 5,530,478 A | 6/1996 | Sasaki et al. .......... 375/240.04 |
| 5,754,244 A | 5/1998 | Kahlman ................ 348/448 |
| 5,929,915 A | * | 7/1999 | Cho .................. 375/240.13 |
| 6,072,908 A | * | 6/2000 | Park et al. ............. 382/243 |
| 6,108,449 A | * | 8/2000 | Sekiguchi et al. ........ 382/236 |
| 6,243,418 B1 | * | 6/2001 | Kim .................. 375/240.12 |
| 6,256,345 B1 | * | 7/2001 | Cho ................. 375/240.08 |

* cited by examiner

*Primary Examiner*—Chris Kelley
*Assistant Examiner*—Allen Wong
(74) *Attorney, Agent, or Firm*—J. Harold Nissen; Lackenbach Siegel

(57) ABSTRACT

Shape information coding device for interlaced scanning video and method in which the shape information coding device and method can detect an amount of motion of object video, on coding of interlaced scanning video, select field or frame coding mode in accordance with the detected result, perform motion compensation in a field unit if the selected coding mode is the field mode, and perform motion compensation in a frame unit if the selected coding mode is the frame mode. In addition, the present invention can construct one frame with two fields, upon coding of shape information for the interlaced scanning video, and then determine a motion vector predictor for shape by using motion information of adjacent block so as to perform an effective coding of the shape information motion information. At this time, the coding efficiency can be improved by a method contemplating preceding a motion vector having the same motion prediction mode as the current motion vector for the motion vector predictor for shape having a high similarity and determining the motion vector predictor for shape and by a method contemplating performing coding of the field block type information and the filed discrimination information for one field of the two fields.

17 Claims, 17 Drawing Sheets

(a) Progressive scanning (b) Interlaced scanning

FIG. 3 (PRIOR ART)
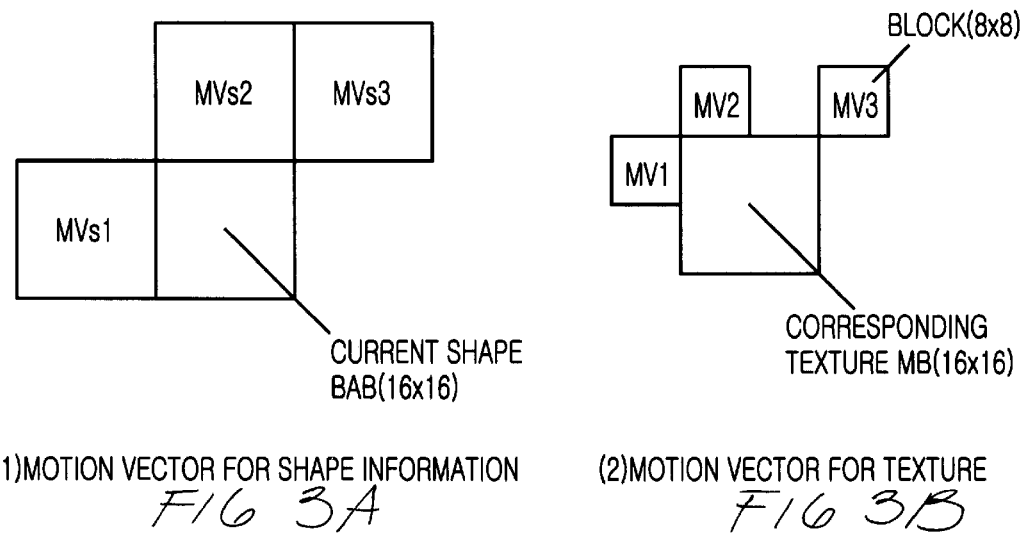
(1) MOTION VECTOR FOR SHAPE INFORMATION
FIG. 3A
(2) MOTION VECTOR FOR TEXTURE
FIG. 3B
FIG. 5 (PRIOR ART)
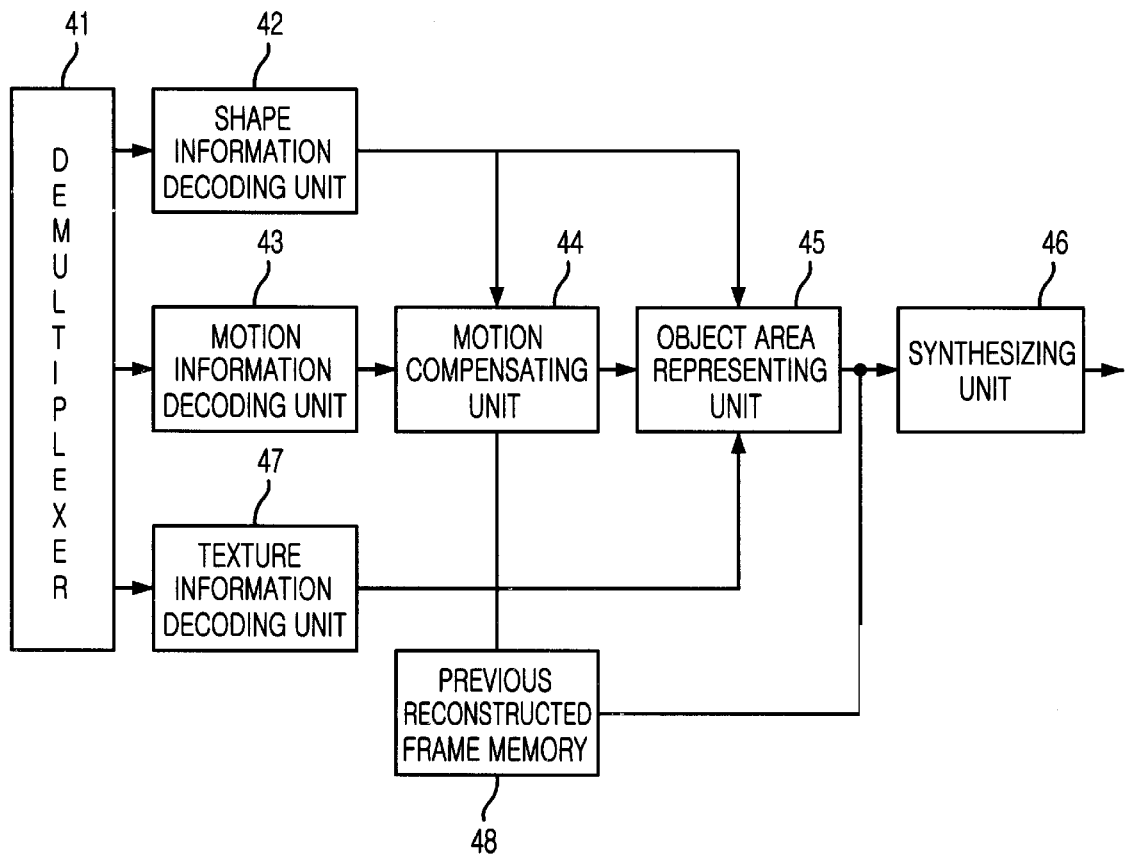

EXTENDED MC FRAME BAB          BORDERED MC FRAME BAB x : MC BAB PIXEL
△ : BORDER PIXEL (a) BORDERED MC BAB FOR FIELD MODE

EXTENDED CURRENT FRAME BAB          BORDERED CURRENT FRAME BAB x : CURRENT BAB PIXEL
△ : BORDER PIXEL
o : PIXEL UNKNOWN AT DECODING TIME (b) BORDERED CURRENT BAB FOR FIELD MODE (a) MOTION VECTOR FOR SHAPE INFORMATION (b) MOTION VECTOR FOR TEXTURE (a) MOTION VECTOR FOR SHAPE INFORMATION (b) MOTION VECTOR FOR TEXTURE (a) MOTION VECTOR FOR SHAPE INFORMATION    (b) MOTION VECTOR FOR TEXTURE (a) MOTION VECTOR FOR SHAPE INFORMATION    (b) MOTION VECTOR FOR TEXTURE (a) MOTION VECTOR FOR SHAPE INFORMATION (b) MOTION VECTOR FOR TEXTURE (a) MOTION VECTOR FOR SHAPE INFORMATION (b) MOTION VECTOR FOR TEXTURE (a) MOTION VECTOR FOR SHAPE INFORMATION (b) MOTION VECTOR FOR TEXTURE (a) MOTION VECTOR FOR SHAPE INFORMATION (b) MOTION VECTOR FOR TEXTURE (a) MOTION VECTOR FOR SHAPE INFORMATION  (b) MOTION VECTOR FOR TEXTURE (a) MOTION VECTOR FOR SHAPE INFORMATION  (b) MOTION VECTOR FOR TEXTURE (a) MOTION VECTOR FOR SHAPE INFORMATION (b) MOTION VECTOR FOR TEXTURE

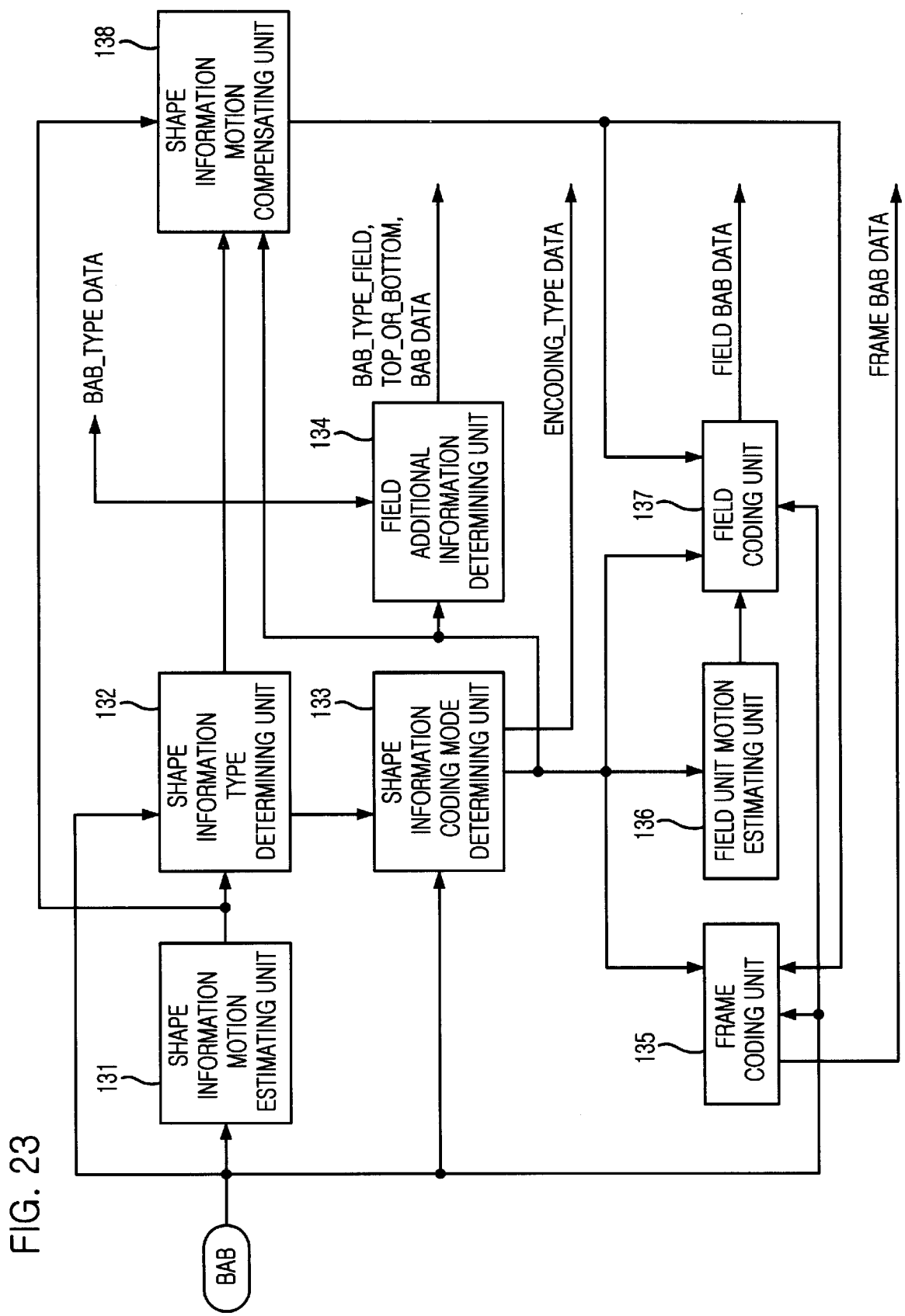

SHAPED INFORMATION CODING DEVICE FOR INTERLACED SCANNING VIDEO AND METHOD THEREFOR

BACKGROUND OF THE INVENTION

1. Field of the Invention

The present invention relates to a shape information coding device for interlaced scanning video and method therefor, and more particularly, to a shape information coding device for interlaced scanning video and method therefor which can detect an amount of motion of object video, on coding of interlaced scanning video and encode the object video in a frame type block unit or in a field type block unit in accordance with the detected result.

2. Discussion of Related Art

With the recent development of the research of next generation video/audio coding technology and system construction, improved effort is tried for video/audio applications which have not been supported by the well known standard plans such as, for example, H.263 and H.261 of ITU-T, and MPEG-1 and MPEG-2 of ISO/IEC. Examples of the accomplished functions are object-based interactive functionality and object-based manipulation. To provide various kinds of new functions, shape information should be of course transmitted. The shape information serves to divide video into an object area and non-object area(that is, background), to allow a signal process in transmitting/receiving terminals to be implemented not for whole video but for object area, and to provide the above new functions.

A general binary shape information has a binary mask type, in which the pixels corresponding to an object have different values from the pixels to non-object. For instance, the pixel corresponding to the object has a logic value of "1", and that corresponding to the non-object has a logic value of "0". A method for coding motional video by using the shape information is called. "object-based video coding".

In other words, the divided object video can be coded and compressed, independently of the background video. In the case where an object to be coded in the video screen exists, an operation for coding the shape information corresponding to the object or area is necessary. The shape information coding method is achieved in a context-based arithmetic encoding(hereinafter, referred to "CAE") manner, under arithmetic encoding by using a probability table of the context configuration.

FIG. 1 is a block diagram illustrating configuration of a representative object-based video coder. Firstly, each of video signals is divided into shape information and texture information. The shape information is inputted to a shape information coding unit 11 and the texture information to a motion estimating unit 12.

In the shape information coding unit 11, a lossy coding or a lossless coding process is performed for the shape information of the corresponding video, and a reconstructed shape information as an output of the shape information coding unit 11 is inputted to the motion estimating unit 12, a motion compensating unit 13 and a texture information coding unit 17, respectively, in an object unit.

Meanwhile, shape information bitstream as another output of the shape information coding unit 11 is inputted to a multiplexer 18. The motion estimating unit 12 serves to estimate motion information for the texture information of current video, by using the texture information inputted in current frame and the texture information of the previous video stored in a previous reconstructed frame memory 14.

The estimated motion information is inputted to the motion compensating unit 13 and the coded motion information is also inputted to the multiplexer 18. The motion compensating unit 13 serves to execute motion compensation prediction by using the motion information obtained by the motion estimating unit 12 and the previous reconstructed frame stored in the previous reconstructed frame memory 14. A subtractor 15 obtains a prediction error between the inputted texture information and the motion compensation texture information obtained by the motion compensating unit 13. A texture information coding unit 17 functions to code the prediction error obtained by the subtractor 15. The texture information bitstream generated from the texture information coding unit 17 is inputted to the multiplexer 18, and the error signal of the reconstructed texture information is inputted to an adder 16. The previous reconstructed frame memory 14 stores the previous reconstructed frame signal which is outputted from the adder 16 in which the motion compensation prediction signal and the reconstructed error signal are added.

On the other hand, a digital video is divided into a progressive scanning video and an interlaced scanning video in accordance with the structure arrangement of frame. In the progressive scanning video, frames are arranged in order by one line and the video is coded, transmitted and displayed in one frame unit. Contrarily, in the interlaced scanning video, two fields are arranged in order by one line, and each frame is formed in the manner where the two fields are inserted therein by one line, so that the height(the number of lines) of each field is half the height of the frame.

Examples of the progressive scanning frame and interlaced scanning frame are shown in FIGS. 2A and 2B.

In more detail, FIG. 2A shows the progressive scanning frame and FIG. 2B shows the interlaced scanning frame in which two fields(top field and bottom field) are inserted by one line. The top field(indicated by a solid line arrow) and bottom field(indicated by a dotted line arrow) are arranged by one line in the interlaced scanning frame, so that the solid line arrow and the dotted line arrow are arranged in turn in the frame. As shown in FIG. 2B, a time difference between the top and bottom fields exists, and in this case, the top field precedes the bottom field. However, the bottom field may precede the top field. Because of the time difference between the top and bottom fields, signal characteristics between the lines adjacent to each other within the interlaced scanning frame can be different. More particularly, the different signal characteristic is apparent in the video having a large amount of motion information.

FIGS. 3A and 3B are views each illustrating a method for determining a motion vector predictor for shape(hereinafter, referred to as "MVPs") in a conventional shape information coding method. FIG. 3A shows a current shape binary alpha block(hereinafter, referred to as "BAB"), the BABs of left side, top side and right top side of the current shape BAB, and the motion vector of each of the BABs adjacent to the current shape BAB. At this time, it is assumed that the size of BAB is 16×16. FIG. 3B shows a texture information macroblock(hereinafter, referred to as "MB") corresponding to the current shape BAB, the MBs of left side, top side and right top side of the MB, and the motion vector of each of the MBs adjacent to the MB. At this time, it is assumed that the size of MB is 16×16, in the same manner as the BAB. Each of the motion vectors MV1, MV2 and MV3 of the adjacent blocks to the texture information MB indicates the motion vector of the corresponding block, and if the corresponding MB estimates and compensates one motion vector per 16×16 MB, the motion vector of the MB is the same as the above. However, if the corresponding MB estimates and compensates one motion vector per 8×8 MB, the motion vector of the MB positioned is indicated. The motion vector MVs of the current shape BAB is given as follows: MVs= MVDs(motion vector difference value for shape)+MVPs. In other words, the MVPs is first determined and from the determined value, the MVDs is obtained. The MVDs is the information which is transmitted to the receiving terminal from the transmitting terminal. The receiving terminal determines the MVs with the MVDs transmitted from the transmitting terminal and the MVPs obtained in the same manner as the transmitting terminal. Therefore, since the MVPs is obtained by using the same information as the transmitting and receiving terminals, the determination of the MVPs should be made by using only the information which has been decoded and stored in the receiving terminal. As shown in FIGS. 3A and 3B, a method of determining the MVPs comprises the steps of checking whether the corresponding motion vector exists in the order of MVs1, MVs2 and MVs3 for the shape BAB and in the order of MV1, MV2 and MV3 for the texture information MB and determining the motion vector in the priority order as the MVPs. For instance, in the case where the motion vector of the shape information exists only in the top side block MVs2 and the right top side MVs3, the MVPs is determined as the MVs2.

The existence/non-existence of the motion vector are determined in consideration of the following two cases.

Firstly, in the case where the corresponding BAB or MB is in the intra-video mode, the motion vector does not exist. Since the motion compensation is not performed in the intra-video mode, the motion vector is not transmitted to the receiving terminal. Secondly, in the case where the object pixel does not exist within the corresponding BAB or MB, the motion vector does not exist. In this case, since the motion compensation is not performed, the motion vector is not transmitted to the receiving terminal. The motion vector does not exist in the BAB or MB of the above-mentioned cases. As known, the above-discussed method is already disclosed in the MPEG_4(Moving Picture Expert Group_ 4) Visual CD(Committee Draft).

FIGS. 4A and 4B are views illustrating the borderings upon coding of the interlaced scanning video, in which FIG. 4A shows a view of a bordered motion compensation (hereinafter, referred to as "MC") BAB in the size 16×16 of BAB. As shown, the frame type BAB includes the bordered MC BAB in the size 16×16 of BAB. The interior of the solid line indicates the BAB(16×16) to be coded. The field type BAB as shown in FIG. 4A is divided into the top and bottom fields having the size 8×16. In the corresponding top field, the 8×16 block brings the bordered data from the top field, and in the corresponding bottom field, the block brings the bordered data from the bottom field. Thus, in the field mode of FIG. 4A the bordered MC BAB is divided into two fields. FIG. 4B is a view illustrating a bordered current BAB of the size 16×16 of BAB. The field type BAB as shown in FIG. 4B is divided into the top and bottom fields having the size 8×16. In the corresponding top field, the 8×16 block brings the bordered data from the top field, and in the corresponding bottom field, the block brings the bordered data from the bottom field. Thus, in the field mode of FIG. 4B the bordered current BAB is divided into two fields. That is, the field type block of FIG. 4B brings the bordered data corresponding only to the top border and left border from each of the top and bottom fields.

As known, the above-discussed method is already disclosed in the MPEG_4 Visual CD.

FIG. 5 is a block diagram illustrating configuration of a representative object-based video decoder. Shape information bitstream, motion information bitstream and texture information bitstream outputted from a demuliplexer 41 are respectively inputted to a shape information decoding unit 42, a motion information decoding unit 43 and a texture information decoding unit 47, to be thereby decoded to shape and motion forming an object area and to texture information of the interior of the object, respectively. The decoded signal in the motion information decoding unit 43 is inputted to a motion compensating unit 44, in which a motion compensating operation is performed by using the decoded signal. An object area signal is represented in an object area representing unit 45. The represented object area signal is inputted to a synthesizer 46 in which a plurality of the represented object area signals are synthesized to thereby represent an original video.

FIGS. 6A and 6B are views illustrating the comparison of construction in a frame unit and in a field unit.

White lines indicate the top fields and the gray lines indicates the bottom fields. In case of the progressive scanning video, coding efficiency is not greatly deteriorated when the coding is executed in the frame type block unit. Meanwhile, in case of the interlaced scanning video, since one frame is divided into two fields, the shape is formed in a complicated manner, as shown in FIG. 8A, to thereby decrease the coding efficiency, if the frame BAB is coded in the BAB unit.

FIGS. 7A to 8B show the problems caused in the interlaced scanning video. Firstly, FIGS. 7A and 7B are views illustrating the video having a little amount of motion in case of the presence of binary shape information, in which FIG. 7A shows a frame type MB and FIG. 7B shows a field type MB. The video is mainly displayed in a still image or the video having a little amount of motion. Change of the video shape between the two fields is little because time variation is greatly little. In this case, the coding of the shape information is preferable in the frame unit.

FIGS. 8A and 8B are views illustrating the video having a large amount of motion in case of the presence of binary shape information, in which FIG. 8A shows a frame type MB and FIG. 8B shows a field type MB. The video is mainly displayed in the picture having a large amount of motion. Change of the video shape between the two fields is serious because time variation is great. In this case, the coding of the shape information is preferable in the field unit. As shown in FIG. 8A, the variation of the BAB is not serious in the field unit block. At this time, in case of the interlaced scanning, since one frame is divided into two fields, when the frame BAB is coded in the BAB unit, the video difference between the two fields, as shown in FIG. 8A, as much as the size of motion is generated. In the case where the size of motion between the two fields is large, if the conventional frame coding method is embodied, there occurs a problem that a large number of the shape information coding bits are generated. If the number of the shape information coding bit is large, the data compression efficiency is decreased since a large amount of data should be transmitted. As known above, the determination of the MVPs is important by the following two reasons: firstly, with the accurate determination of MVPs, the size of the MVDs can be reduced and the number of bit generated can be also decreased; and secondly, with the accurate determination of MVPs, the MVs can be accurately obtained and accordingly, with the motion compensation of the BAB, the size of shape information bitstream can be decreased. In conclusion, if the motion vector is accurately estimated and compensated upon coding of the shape information, the MVPs can be accurately obtained, which will be advantaged in a coding gain respect. However, the conventional MVPs determining method as mentioned above does not reflect the characteristic of the interlacing scanning video. In other words, the conventional MVPs determining method can not be embodied in the case where the BAB or MB performs motion vector estimation, compensation and encoding, in a field unit.

SUMMARY OF THE INVENTION

Accordingly, the present invention is directed to a shape information coding device for interlaced scanning video and method therefor that substantially obviates one or more of the problems due to limitations and disadvantages of the related art.

An object of the invention is to provide a shape information coding device for interlaced scanning video and method therefor which can detect an amount of motion of object video, on coding of interlaced scanning video, and encode the object video in a frame unit or in a field unit in accordance with the detected result.

Another object of the invention is to provide a shape information coding device for interlaced scanning video and method therefor which determines a motion prediction mode of a binary alpha block(BAB) and separates a field predicted BAB and a frame predicted BAB in accordance with the determined motion prediction mode to thereby perform motion vector prediction, upon motion estimation for coding motional video.

According to an aspect of the present invention, a shape information coding method for interlaced scanning video includes the steps of: determining a motion prediction mode of a BAB in a coding mode obtained by using a motion estimation value of the BAB; if the determined motion prediction mode corresponds to a field mode, performing motion compensation in a field type block unit and coding shape information in the field type block unit; and if the determined motion prediction mode corresponds to a frame mode, performing motion compensation in a frame type block unit and coding the shape information in the frame type block unit.

According to another aspect of the present invention, a shape information coding method for interlaced scanning video includes the steps of: determining a motion prediction mode of a BAB in a coding mode obtained by using a motion estimation value of the BAB; if the determined motion prediction mode corresponds to a frame mode, performing motion prediction in a frame type block unit and coding shape information in the frame type block unit; and if the determined motion prediction mode corresponds to a field mode, performing the motion prediction in the frame type block unit and in a field type block unit, re-determining the motion prediction mode, coding additional information for the prediction mode and coding the shape information in the field type block unit.

According to still another aspect of the present invention, a shape information coding device for interlaced scanning video includes: a shape information estimating means for determining a motion prediction mode by shape information motion information estimated from binary shape information inputted, comparing the motion information with motion information of shape information or texture adjacent thereto to thereby determine an MVPs, and performing operations of the determined MVPs and the estimated shape information motion information to thereby calculate an MVDs; a shape information type determining means for determining a type of a BAB by the motion information obtained from the shape information motion estimating means; a shape information coding mode determining means for determining a coding mode of the shape information in accordance with an amount of motion variation of the BAB; a shape information motion compensating means for compensating motion of the inputted shape information in accordance with the determined motion prediction mode; a field additional information determining means for determining and coding additional information for a field block type and field discrimination in accordance with the coding mode information obtained in the shape information coding mode determining means and the type information of the BAB obtained in the shape information type determining means; and a shape information coding means for coding the binary shape information outputted from the shape information motion compensating means in a frame unit or in a field unit in accordance with the coding mode information obtained in the shape information coding mode determining means.

Preferably, the shape information coding means is comprised of: a frame coding means for coding the binary shape information in a frame mode, if the coding mode information obtained in the shape information coding mode determining means is frame mode information; a field coding means for coding the binary shape information in a field mode, if the coding mode information obtained in the shape information coding mode determining means is field mode information.

Preferably, the shape information motion estimating means is comprised of: a shape information frame/field prediction mode determining unit for inputting frame/field prediction flag and motion information of an adjacent shape information BAB to thereby determine whether the prediction mode of the shape BAB adjacent to the current BAB is a frame predicted mode or a field predicted mode; an adjacent shape information motion vector extracting unit for outputting motion vector of the shape BAB adjacent to the current BAB to the shape information frame/field prediction mode determining unit; an MVPs order determining unit for inputting the information on whether the shape BAB adjacent to the current BAB is in the frame predicted mode or the field predicted mode from the shape information frame/field prediction mode determining unit to thereby determine an order of the MVPs; a final MVPs determining unit for determining a final MVPs with the MVPs order determining unit and a texture motion vector predictor obtained in a texture motion vector predictor order determining unit; and an MVDs determining unit for determining an MVDs from a difference value between the final MVPs and the estimated shape information motion information.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIGS. 3A and 3B are views each illustrating methods for determining motion vector in a conventional shape information coding method;

FIG. 5 is a block diagram illustrating configuration of a representative object-based video decoder;

FIGS. 12A to 15B are reference views illustrating a determining process of MVPs, in the case where the current shape BAB is a field predicted BAB, adjacent blocks thereto are frame predicted BABs and one or more texture MB is a field predicted MB;

FIGS. 16A to 19B are reference views illustrating a determining process of MVPs, in the case where the current shape BAB is a frame predicted BAB and one or more block adjacent thereto is a field predicted BAB;

FIGS. 21A to 22B are reference views illustrating a determining process of MVPs, in the case where the current shape BAB is a field predicted shape BAB and one or more of three BABs(MVs1, MVs2 and MVs3) adjacent thereto is a field predicted BAB; and FIG. 23 is a block diagram illustrating configuration of a shape information coding device for interlaced scanning video according to another embodiment of the present invention.

DETAILED DESCRIPTION OF PREFERRED EMBODIMENT

Reference will now be made in detail to the preferred embodiments of the present invention, examples of which are illustrated in the accompanying drawings.

Now, the construction and operation of a shape information coding device for interlaced scanning video according to a preferred embodiment of the present invention will be discussed hereinafter. In case of interlaced scanning video, coding efficiency is varied in accordance with an amount of motion. In the preferred embodiment of the present invention, a frame BAB and a field BAB are adaptively divided from each other and are then coded, thus to achieve an optimal coding efficiency.

Figure 9:
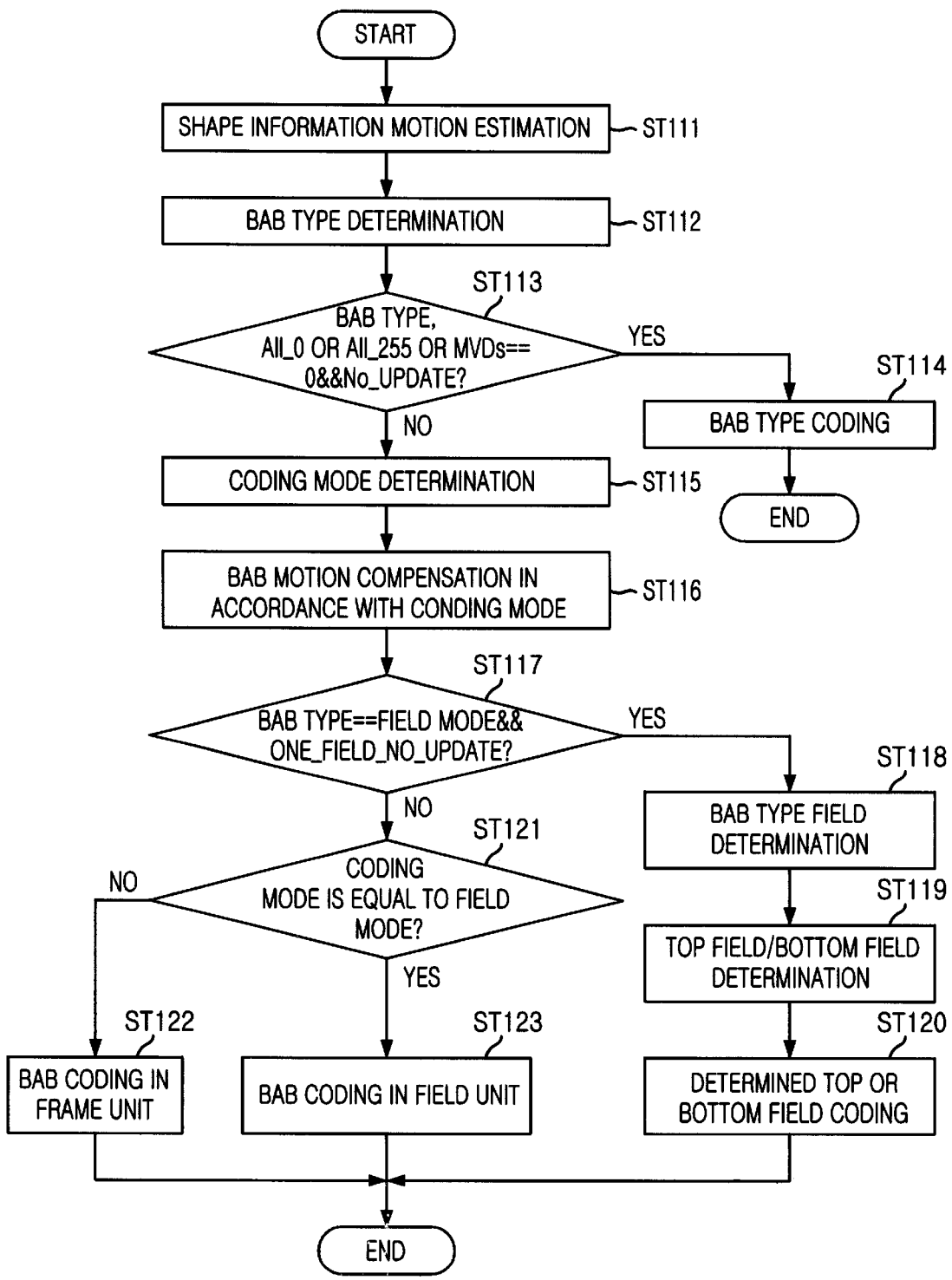
FIG. 9 is a flow chart illustrating a shape information coding method for interlaced scanning video according to the present invention.

FIG. 9 is a flow chart illustrating a shape information coding method for interlaced scanning video according to the present invention. In the present invention, the coding of shape information is executed not in a whole video unit, but in a BAB unit, as shown in FIG. 9. In this figure, an input is the BAB, and the steps shown in FIG. 9 as many as the number of the BAB in one video are taken. At step ST111, motion information MVs of BAB is estimated by using shape information of reference picture of a previous frame. At this step, a piece of motion information per BAB may be estimated(16×16 frame motion vector), or if the BAB is divided into a top field and a bottom field, two pieces of motion information may be estimated in a field unit(8×16 field motion vector). If the one piece of motion information and two pieces of motion information are at the same time estimated, a flag(for instance, in case of field estimation, flag of "1" and in case of frame estimation, flag of "0") indicative of the estimated motion information should be inputted to a receiving terminal. Then, by using the estimated motion information, a motion prediction mode and an order of an MVPs is determined and the MVPs is obtained. Next, the texture motion vector prediction value MVP(obtained in a motion estimating unit 12 of FIG. 1) and the MVPs are compared to thereby determine a final MVPs. Further, the determined MVPs is subtracted from the estimated shape information motion vector MVs to thereby obtain an MVDs. At step ST112, the BAB type(BAB_type) as additional information of the shape information is determined. For instance, the BAB_type is classified into ALL_0, ALL_255, MVDs=0&&No_update, MVDs!=0&&No_update, IntraCAE, MVDs=0&&InterCAE, and MVDs!=0&&InterCAE. If the BAB_type is equal to ALL_0, no image information(pixel) to be transmitted to the BAB(16×16) exists. If the BAB_type is equal to ALL_255, image information(pixels) to be transmitted to the BAB(16×16) are 256 in number. If the BAB_type is equal to MVDs=0&&No_update, no motion information to be transmitted exists and prediction error information is not transmitted. That is, the error information to be transmitted is not generated in the BAB. If the BAB_type is equal to MVDs!=0&&No_update, motion information to be transmitted exists and prediction error information is not transmitted. If the BAB_type is equal to IntraCAE, CAE coding is executed without having reference shape information of a previous frame. If the BAB_type is equal to MVDs=0&&InterCAE, no motion information to be transmitted exists and CAE coding is executed with the reference shape information. In other words, an error between the current BAB and the previous BAB in which motion compensation has been executed is coded in the CAE manner. Finally, if the BAB_type is equal to MVDs!=0&&InterCAE, motion information to be transmitted exists and the CAE operation is executed with the reference shape information. At step ST113, it is determined whether the BAB_type is equal to ALL_0, ALL_255, or MVDs=0&&No_update, in which the coding of the BAB is not necessary. If the BAB_type is equal to ALL_0, ALL_255, or MVDs=0&&No_update, the BAB_type is coded at step ST114 and the coding procedure is ended. However, if the BAB_type is not equal to ALL_0, ALL_255, or MVDs=0&&No_update, more effective compression coding mode among a field type shape information coding and a frame type shape information coding is determined at step ST115 to perform an adaptive interlaced scanning shape information coding. That is, at the step ST115, the coding mode is determined. The determination of coding mode depends upon an amount of motion variation. The determination of the varied amount of motion within the BAB is made by the following equation (1):

$$\sum_{\substack{i=0 \\ j=0}}^{6} \sum_{j=0}^{15} (|P_{2i,j} - P_{2i+1,j}| + |P_{2i,j} - P_{2i+1,j}|) \geq \quad (1)$$

$$\sum_{i=0}^{6} \sum_{j=0}^{15} (|P_{2i,j} - P_{2i+2,j}| + |P_{2i+1,j} - P_{2i+3,j}|)$$

wherein, the pixel in which an object exists is designated to "1" and the pixel in which the object does not exist is designated to "0". Also, the 'i' indicates the position of vertical direction in BAB, and the 'j' indicates the position of horizontal direction in BAB. The P(i, j) is a pixel value of the position(i,j) within the BAB. If the pixel value P(i, j)='0', the pixel of the corresponding position is placed in the background, and if the pixel value P(i, j)='1', the pixel of the corresponding position is placed in the object. Meanwhile, the equation (1) is applied in the BAB having the size of 16×16, and may be modified in a proper manner, if the BAB has different sizes. The left side equation of the equation (1) is obtained by calculating a difference between pixel values in an even-numbered scanning line(top field) and pixel values in an odd-numbered scanning line(bottom field), for each pixel and adding the accumulated pixel values. On the other hand, the right side equation of the equation (1) is obtained by calculating a difference between pixel values in the even-numbered scanning line and pixel values in next even-numbered scanning line and a difference between pixel values in the odd-numbered scanning line and pixel values in next odd-numbered scanning line, for each pixel and adding the accumulated pixel values. The value of the left side equation of the equation (1) is high, since a time difference between the odd-numbered scanning line and the even-numbered scanning line is great, in the case where the amount of motion is large, and contrarily, the value of the right side equation of the equation (1) is relatively low, since time differences between the odd-numbered scanning lines and between the even-numbered scanning lines are little, even during a little amount of motion.

Therefore, in the case where the amount of motion is large, the value of the left side equation in the equation (1) is higher than that of the right side equation. To the contrary, in the case where the amount of motion is small, the value of the left side equation in the equation (1) is lower than that of the right side equation. At the step ST115, if the value of the left side equation is higher than that of the right side equation, the coding mode is determined as a field mode coding. However, if the value of the right side equation is higher than that of the left side equation, the coding mode is determined as a frame mode coding. Next, at step ST116, the motion of the BAB inputted is compensated in accordance with the determined shape information coding mode. In this case, if the coding mode and the prediction mode are determined to be same as each other, the number of additional information per BAB can be decreased. If a different prediction mode is determined and used, the coding mode and the prediction mode are each coded, such that the coding gain is not generated so much as the increment of the additional information. In the texture information, the texture information motion estimation is executed by field in an accurate manner, such that an amount of coding can be drastically decreased. Therefore, the texture information motion prediction mode is separated from the coding mode information, such that the coding gain can be improved. However, the shape information BAB has a little amount of information as compared with the texture information MB. In other words, a large amount of additional information is damaged to the shape information coding.

At step ST117, in the meanwhile, if the coding mode is the field mode and the BAB type is equal to MVDs!=0&&No__update, the BAB is determined as One__Field__No Update. At steps ST118 to ST120, BAB__type__field is firstly determined. This means one field is No__update and field BAB type information for a different one field. Three types of the variable are No__update, IntraCAE and InterCAE. Then, it is determined whether the field to be coded is a top field or a bottom field. The discriminating information of the determined field is coded and transmitted to the receiving terminal(decoder), and the top or bottom field is coded. Next, the coded binary shape information is transmitted to the receiving terminal(decoder), and the shape information coding of the corresponding BAB is completed. In this coding method, two pieces of additional information are added but if even one field is No__update, the CAE coding is not executed, so that the coding gain is generated.

At step ST121, the coding mode is determined by using the equation (1) and if the frame mode is selected in this step, the coding is executed in the 16×16 BAB unit at step ST122. It is determined whether the BAB type is IntraCAE, MVDs!=0&&No__update, MVDs==0&&InterCAE, or MVDs=0&&InterCAE. The BAB__type is defined to seven types in the shape information CAE coding and is primarily transmitted in the coding transmission order. The two types of the BAB__type are determined at a start step, and another two types are determined after completion of motion estimation. The other three types are determined after the completion of the CAE coding. In other words, the transmission of the BAB__type is performed after the coding of BAB.

At the step ST121, if the coding mode is the field mode, the 16×16 BAB is divided into two 8×16 blocks(hereinafter, referred to as "field BAB"), the field BAB to which the same BAB__type is applied is coded at step ST123. It is determined whether the BAB type is IntraCAE, MVDs!=0&&No__update, MVDs==0&&InterCAE, or MVDs=0&&InterCAE. Here, if the coding mode is the field mode, the motion prediction is performed in the field type block unit and the shape information coding is then performed in the field type block unit. However, if the coding mode is the frame mode, the motion prediction is performed in the frame type block unit and the shape information coding is then performed in the frame type block unit. At this time, another shape information coding method can be embodied in the following manner. If the coding mode is the frame mode, the frame prediction and the coding in the frame unit are performed, and if the coding mode is the field mode, the frame prediction and the field prediction are all performed, and then the portion in which the number of the coding bits is small is determined. The additional information for the determined motion prediction mode(prediction direction) is transmitted to the decoding unit and the coding in the field unit is executed.

Furthermore, still another shape information coding method can be embodied in the following manner. The motion estimation in the field unit and in the frame unit is performed in an initial step, and the motion vector is adaptively applied in accordance with the determined coding mode to thereby perform the motion prediction and the coding of the shape information. Yet another shape information coding method can be embodied in the following manner. Only in the case where the coding mode is selected to the field mode, the motion estimation in the field type block unit and in the frame unit is performed in an initial step, and the motion vector is adaptively applied in accordance with the determined coding mode to thereby perform the motion prediction and the coding of the shape information.

In these coding methods, it is determined whether the coding mode is the field mode or the frame mode by the above equation (1), in the same manner as the above. As another method, it is suggested that all of the coding is executed in the field mode or in the frame mode and thus the coding mode is determined towards the part in which the number of the coding bits is small.

The above-discussed shape information coding is executed in a horizontal direction, but when the real shape information coding is performed, the coding is executed in the horizontal and vertical direction, such that the shape information coding is performed in the part in which the number of the coding bits is small. Then, the direction information as the additional information is transmitted to the decoding unit. The method of coding the shape information in the vertical direction is achieved by changing the BAB by 90° and performing the shape information coding in the same manner as that in the horizontal direction.

Figure 10:
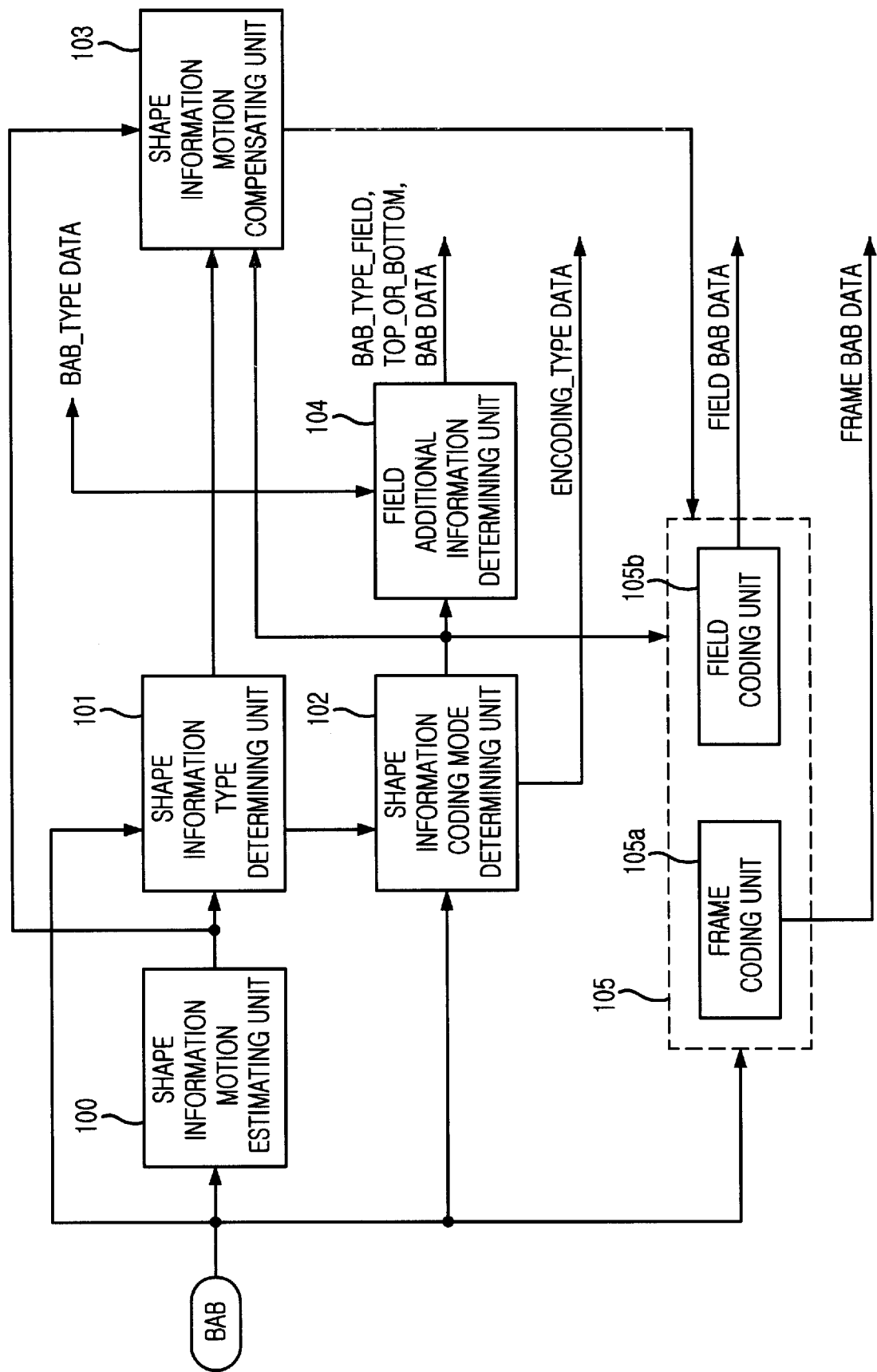
FIG. 10 is a block diagram illustrating configuration of a shape information coding device for interlaced scanning video according to one embodiment of the present invention.

FIG. 10 is a block diagram illustrating configuration of a shape information coding device for interlaced scanning video according to one embodiment of the present invention. In this figure, the shape information coding device includes: a shape information motion estimating unit 100 for estimating motion vector MVs from the BAB inputted, calculating a motion prediction mode and an MVPs, and performing operations of the calculated MVPs and the estimated motion vector to thereby calculate an MVDs; a shape information type determining unit 101 for determining a type of a BAB by the motion information obtained from the shape information motion estimating unit 100; a shape information coding mode determining unit 102 for determining a coding mode of the shape information in accordance with the type mode of the BAB obtained in the shape information type determining unit 101; a shape information motion compensating unit 103 for compensating motion of the inputted shape information in accordance with the flag indicative of the shape information coding mode obtained in the shape information coding mode determining unit 102; a field additional information determining unit 104 for determining and coding additional information for a field block type and field discrimination in accordance with the coding mode information obtained in the shape information coding mode determining unit 102 and the type information of the BAB obtained in the shape information type determining unit 101; and a shape information coding unit 105 for coding the binary shape information outputted from the shape information motion compensating unit 103 in a frame unit or in a field unit in accordance with the coding mode information obtained in the shape information coding mode determining unit 102.

Firstly, the shape information motion estimating unit 100 estimates the motion information of the BAB by using the shape information of the reference picture of a previous frame. At this time, a piece of motion information per BAB may be estimated (16×16 frame motion vector), or if the BAB is divided into a top field and a bottom field, two pieces of motion information may be estimated in a field unit(8×16 field motion vector). If the one piece of motion information and two pieces of motion information are at the same time estimated, a flag(for instance, in case of field estimation, flag of "1" and in case of frame estimation, flag of "0") indicative of the estimated motion information should be inputted to the receiving terminal.

Figure 11:
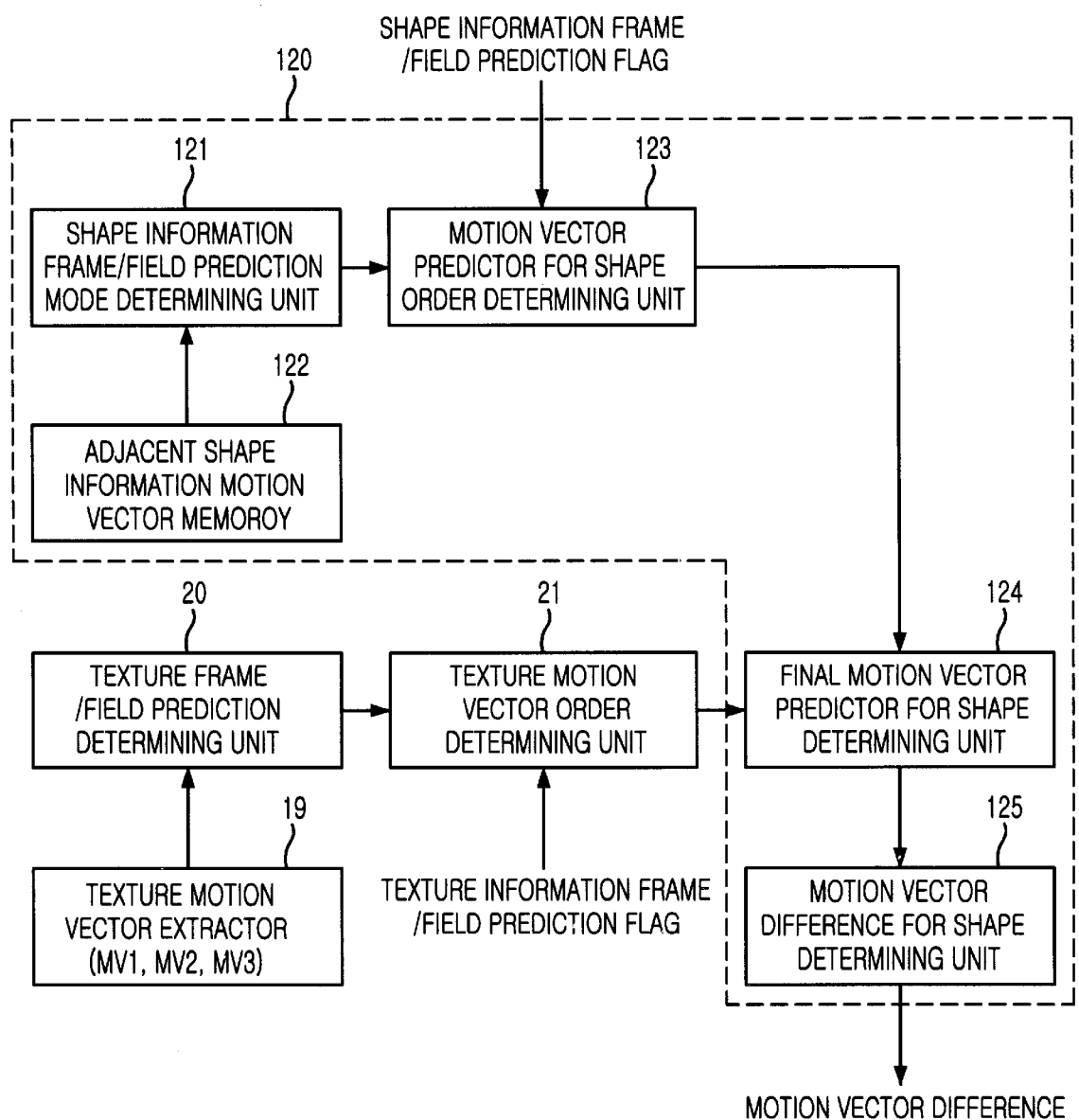
FIG. 11 is a block diagram illustrating a part of the shape information motion estimating unit of FIG. 10 and a determining process of MVPs using a motion vector of a texture motion estimator of FIG. 1.
Figure 12:
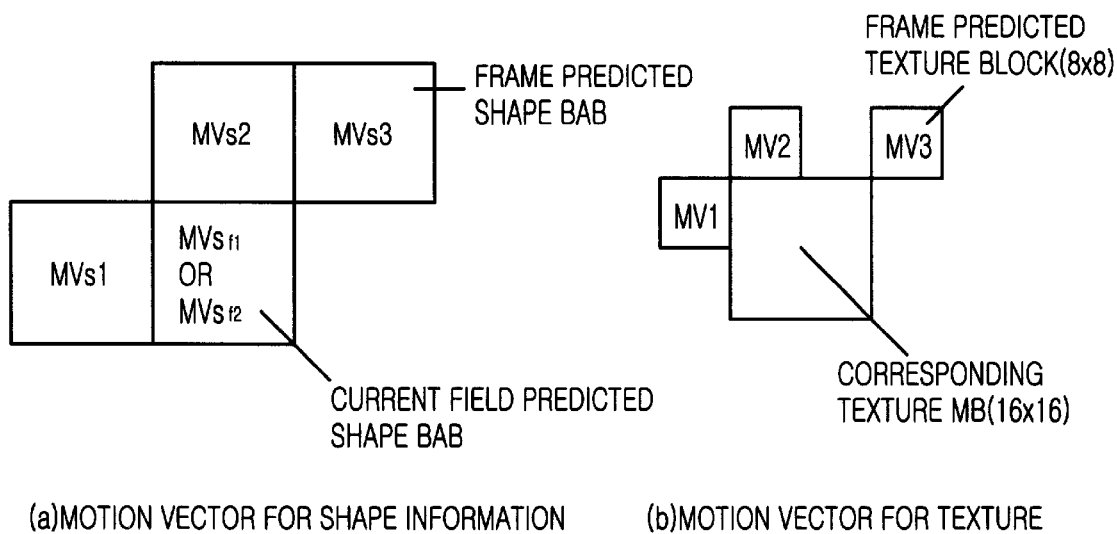
Figure 13:
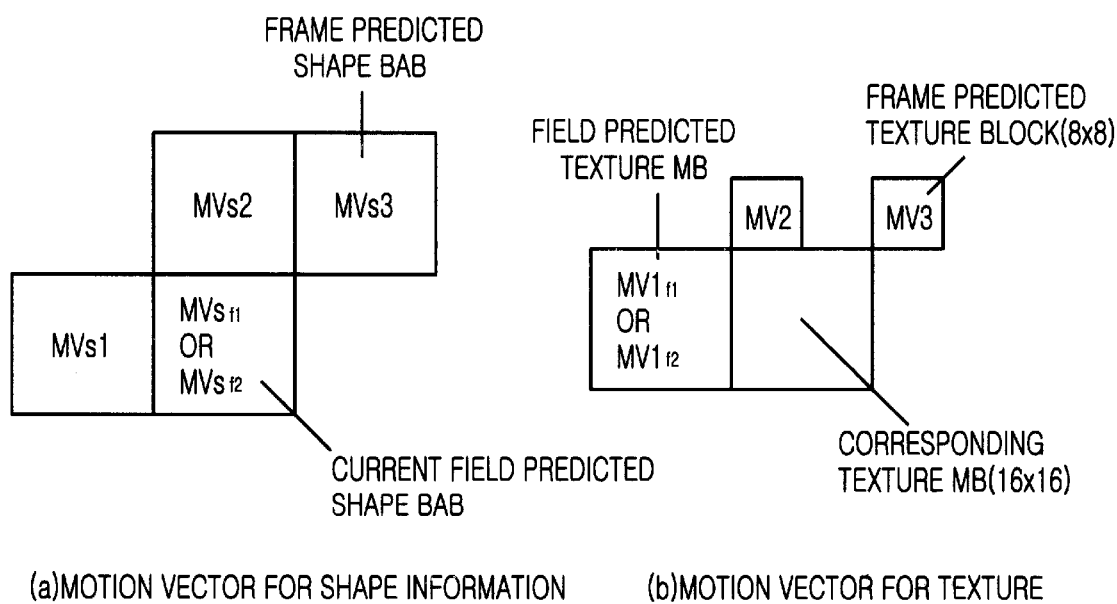
Figure 14:
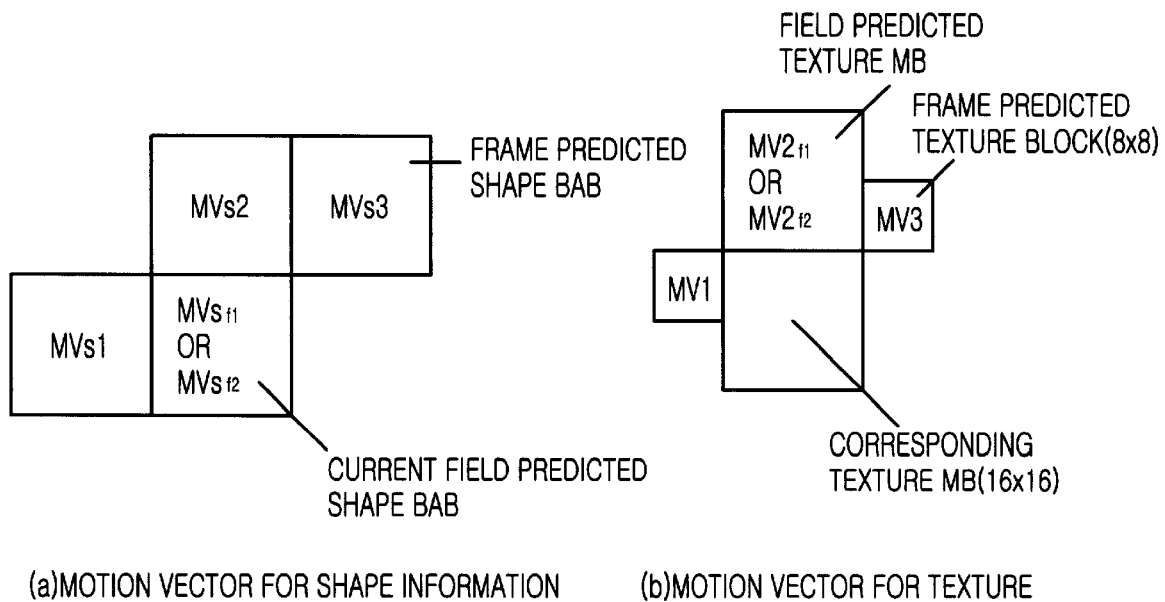
Figure 15:
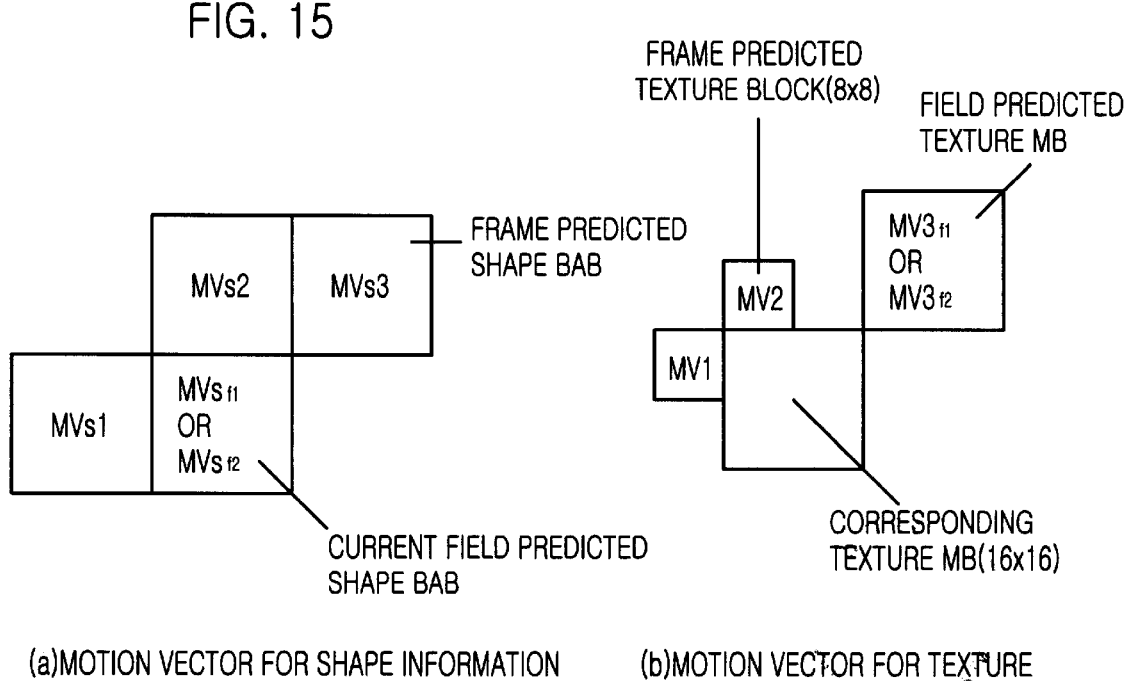
Figure 16:
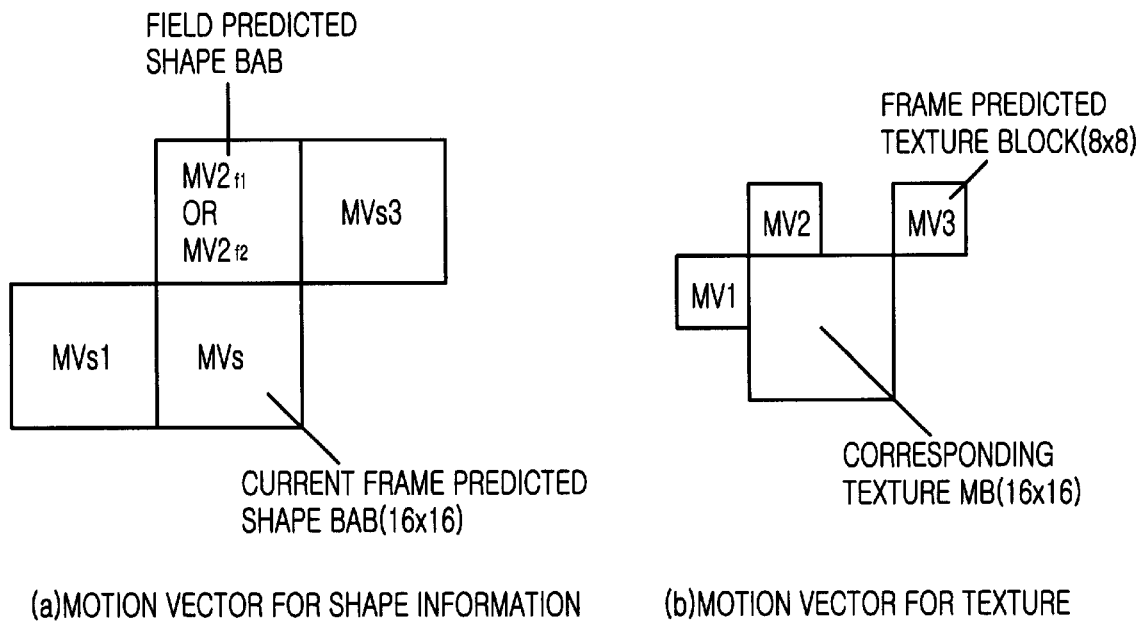
Figure 17:
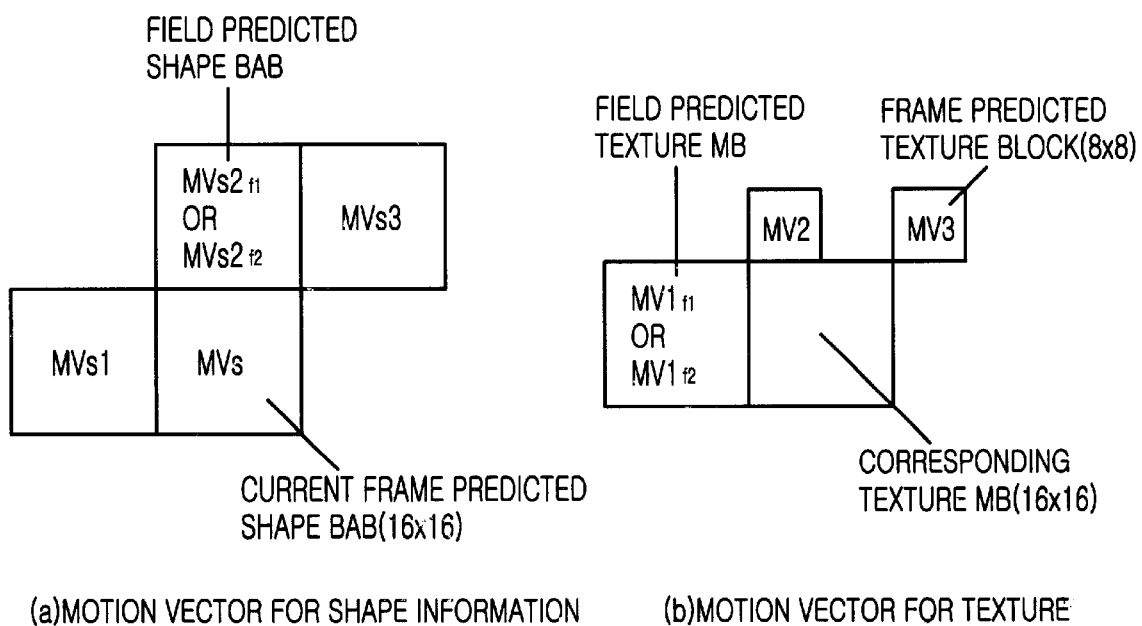
Figure 18:
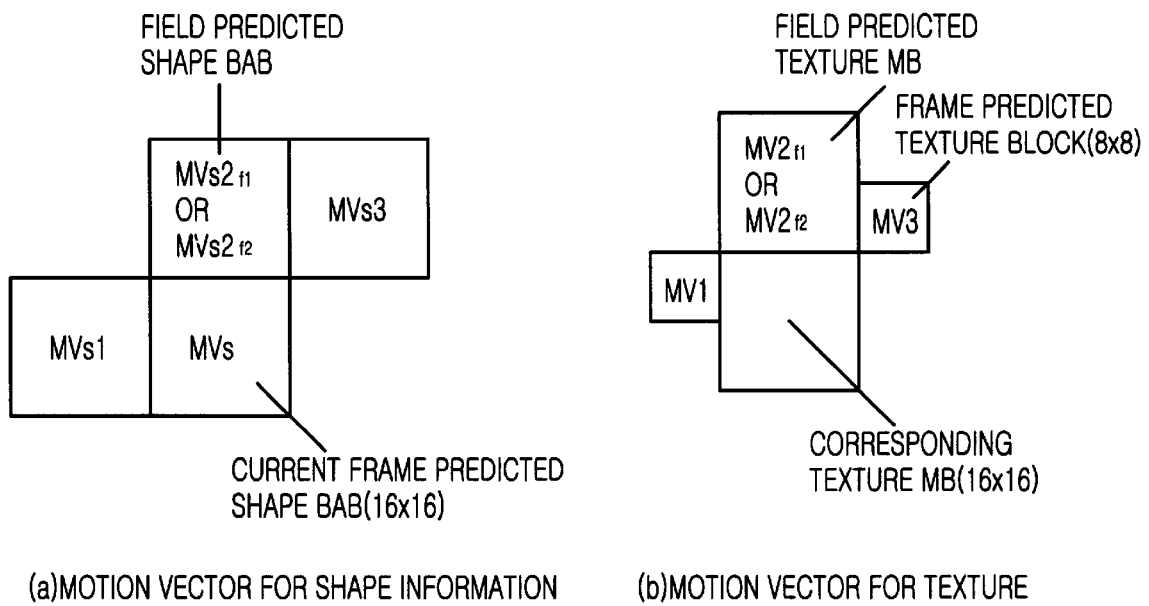
Figure 19:
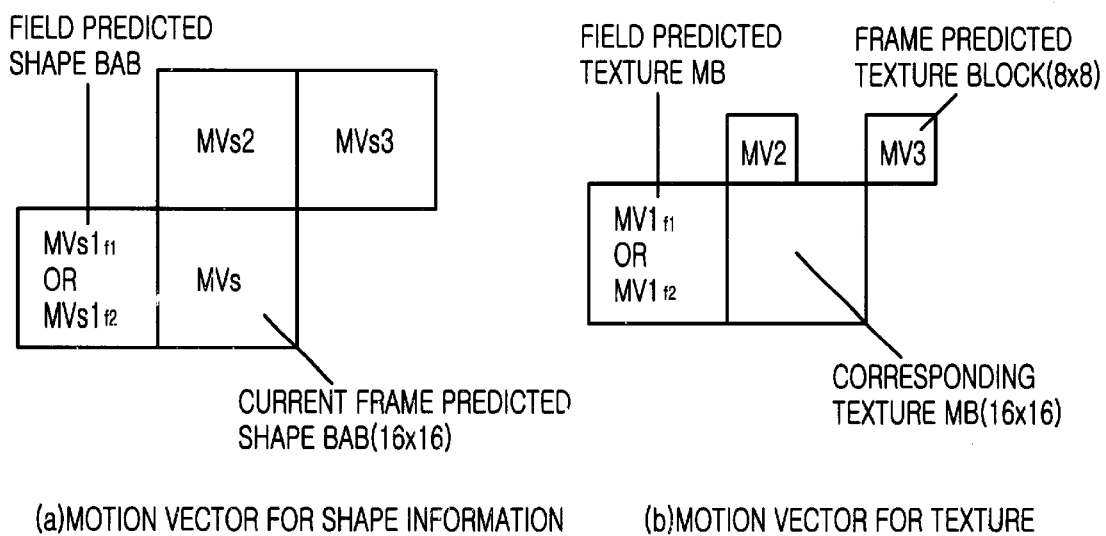
Figure 20:
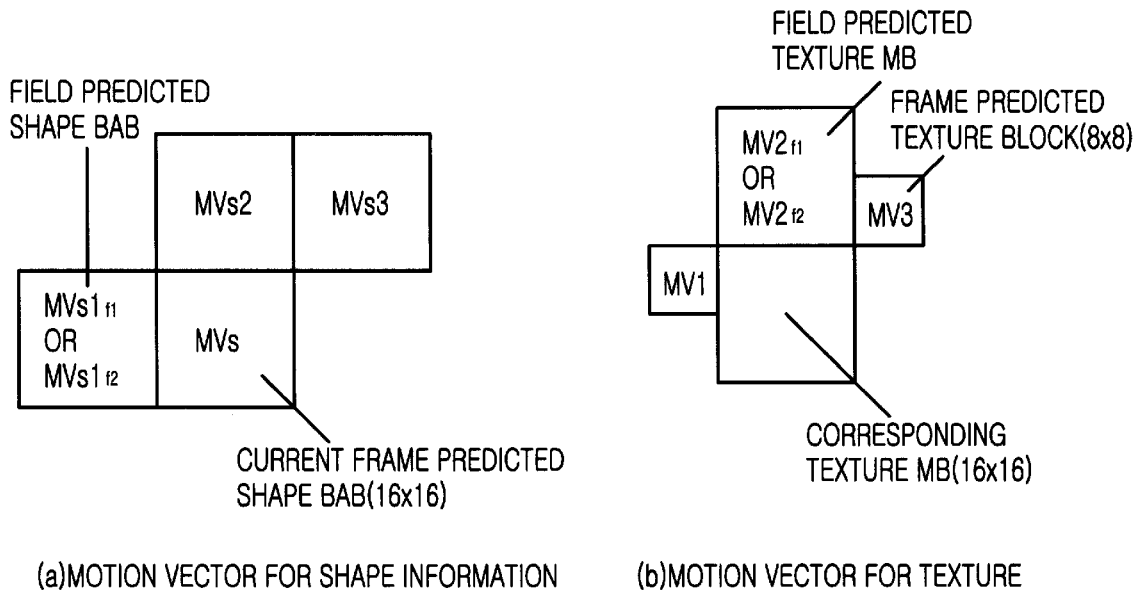
FIG. 20A and 20B are reference views illustrating a determining process of MVPs, in the case where the current shape BAB is a frame predicted BAB and one or more of three BABs(MVs1, MVs2 and MVs3) adjacent thereto is a field predicted BAB.

FIG. 11 is a block diagram illustrating a part of the shape information motion estimating unit 100 of FIG. 10. A reference numeral 120 denotes a part of the shape information motion estimating unit 100, which includes: a shape information frame/field prediction mode determining unit 121 for inputting frame/field prediction flag obtained in the shape information coding mode determining unit 102 and motion vector of an adjacent shape information BAB to thereby determine whether the prediction mode of the shape information BAB adjacent to the current BAB is a frame prediction mode or a field prediction mode; an adjacent shape information motion vector memory 122 for outputting the motion vector of the shape information BAB adjacent to the current BAB to the shape information frame/field prediction mode determining unit 121; a shape information motion vector prediction value order determining unit 123 for inputting the information on whether the shape BAB adjacent to the current BAB is in the frame predicted mode or the field predicted mode from the shape information frame/field prediction mode determining unit 121 to thereby determine order of the MVPs; a shape information final motion vector prediction value determining unit 124 for determining a final MVPs with the MVPs obtained in the shape information motion vector prediction value order determining unit 123 and a texture motion vector prediction value obtained in a texture motion vector prediction value order determining unit 21; and a motion vector difference value determining unit 125 for determining an MVDs from a difference value between the final MVPs obtained in the shape information final motion vector prediction value determining unit 124 and the estimated shape information motion information MVs.

Figure 1:
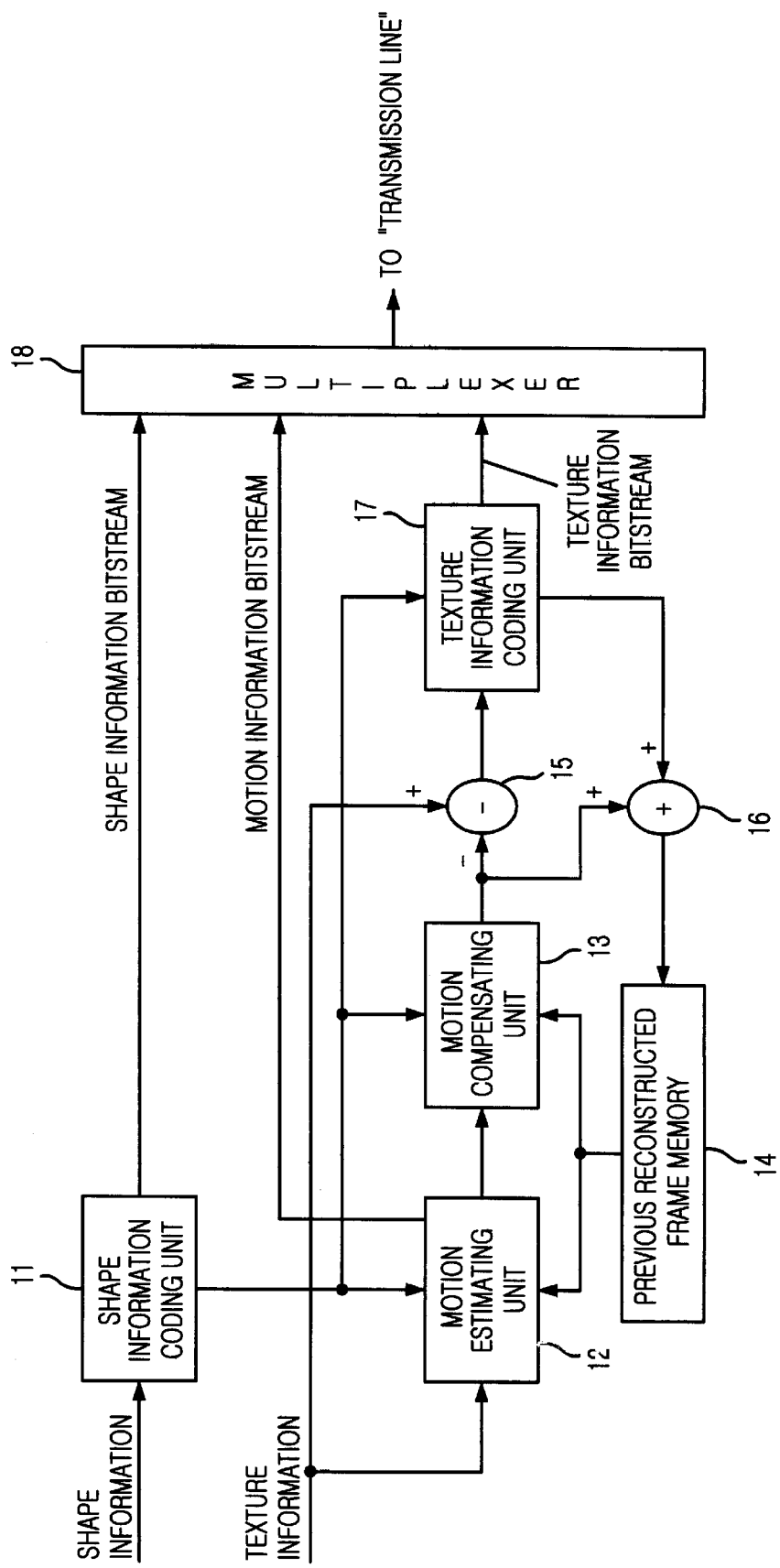
FIG. 1 is a block diagram illustrating configuration of a representative object-based video coder.
Figure 2:
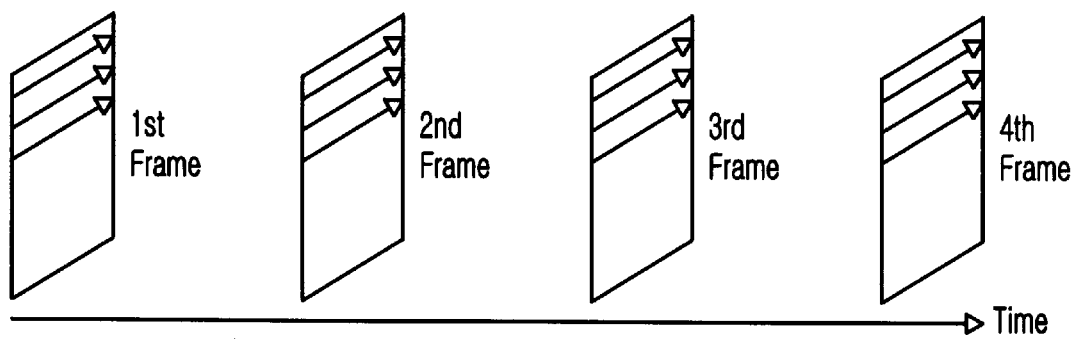
FIGS. 2A and 2B are views each illustrating progressive scanning and interlaced scanning methods.
Figure 2:
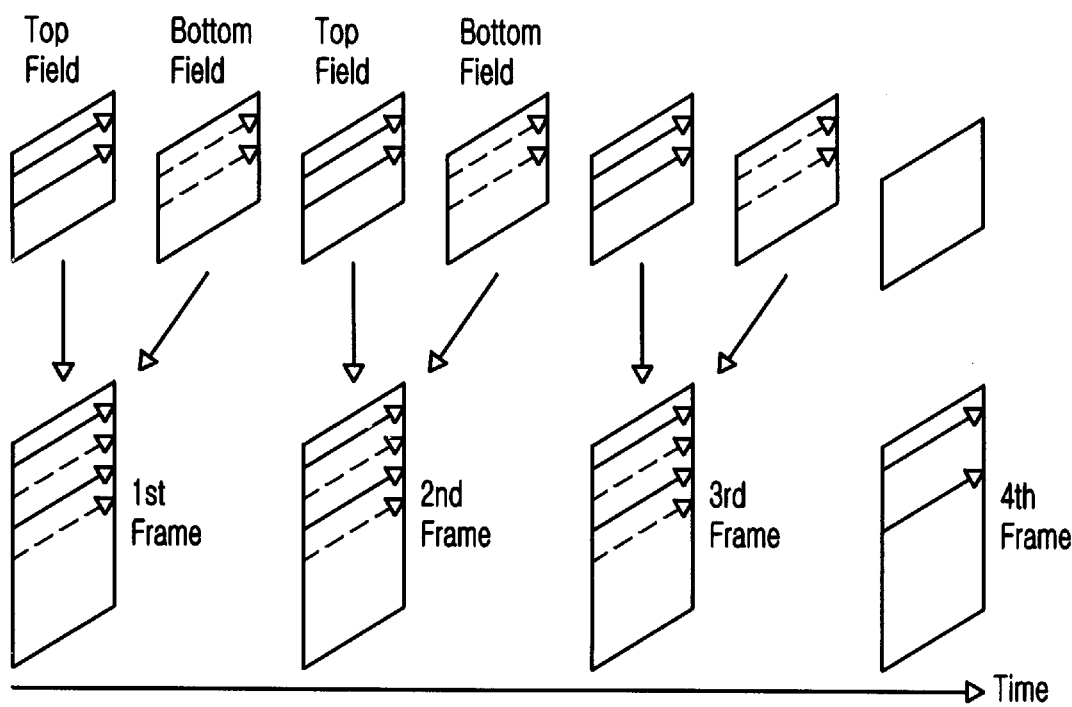
Figure 4:
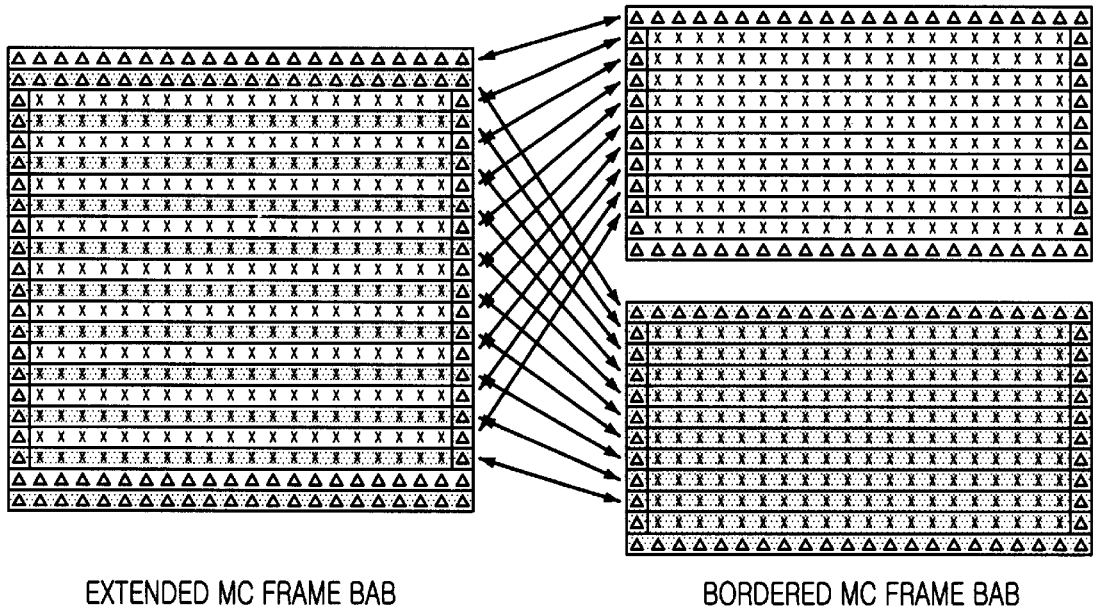
FIG. 4A is a view illustrating a bordered motion compensation BAB(Binary Alpha Block) of BAB(16×16)
FIG. 4B is a view illustrating a bordered current BAB of BAB(16×16)
Figure 4:
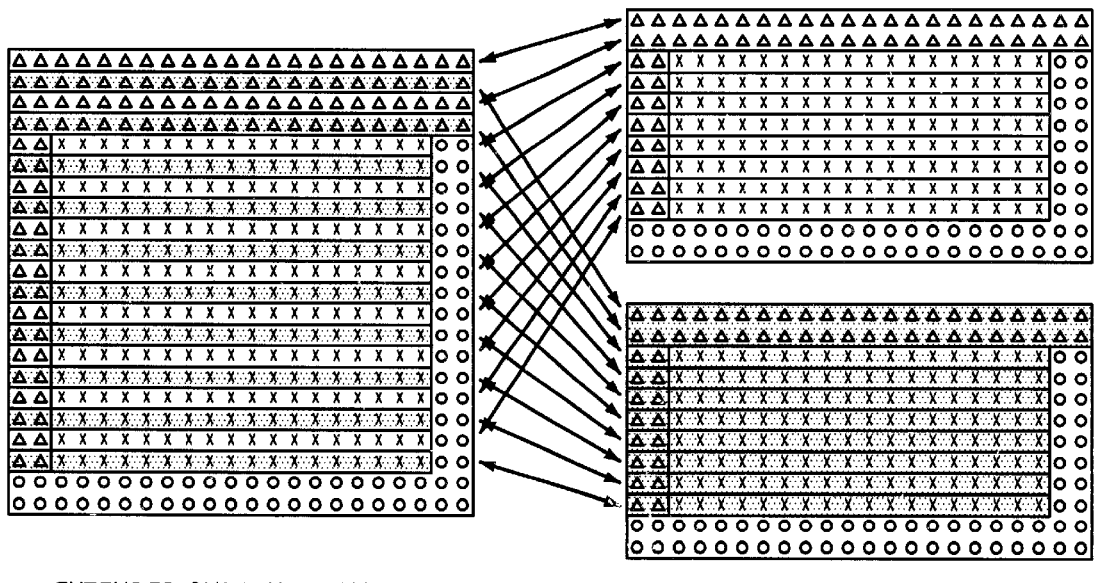
Figure 6:
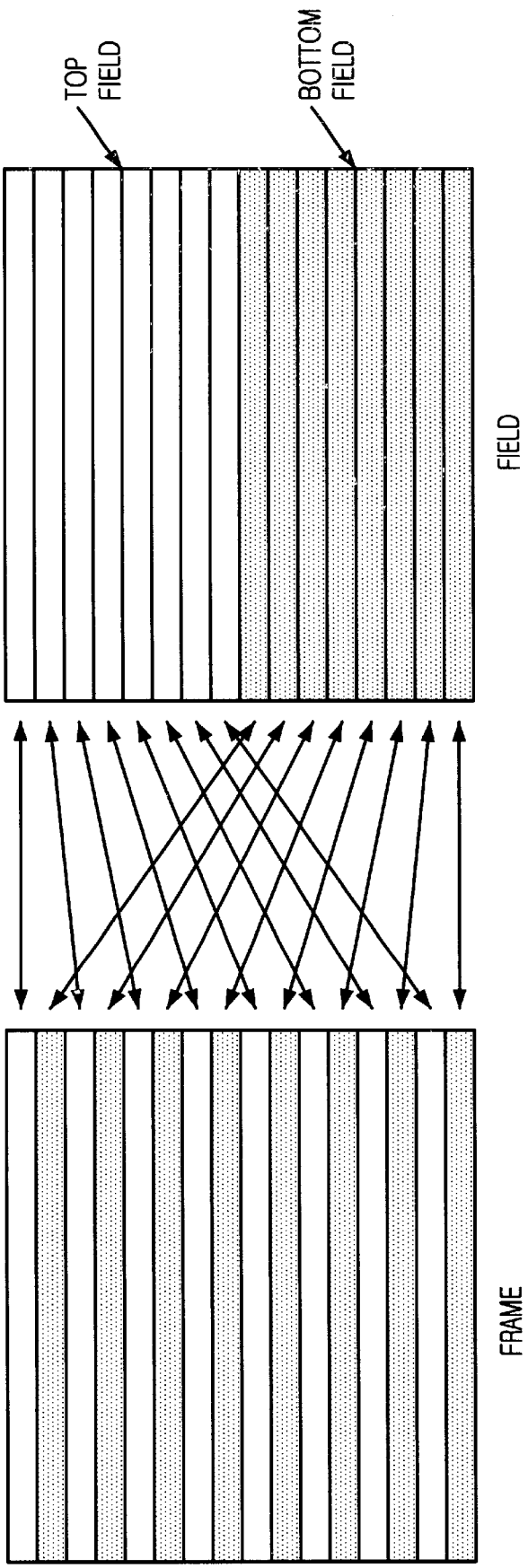
FIGS. 6A and 6B are views illustrating a frame and a field which are each coded in a BAB unit.
Figure 7:
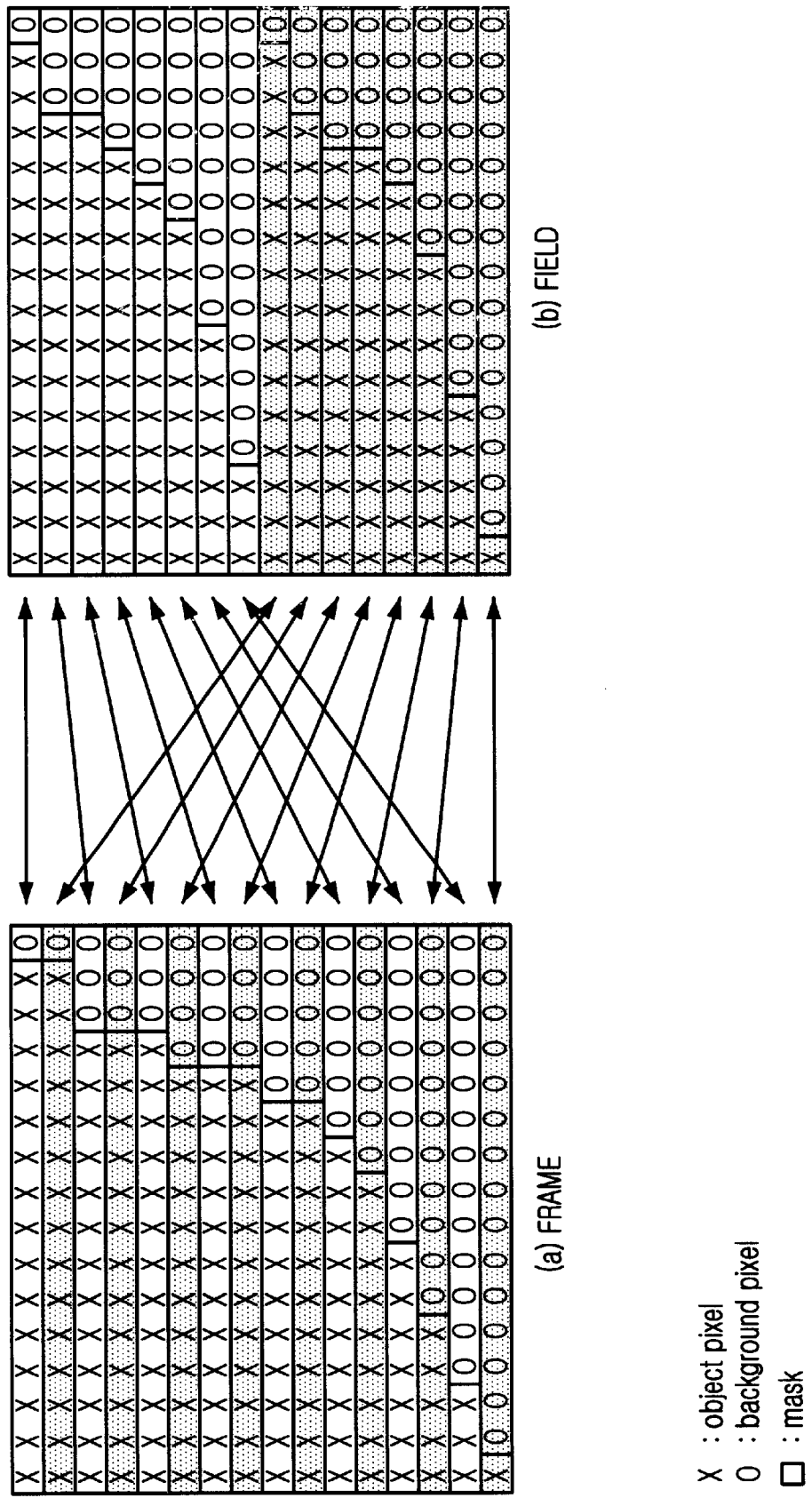
FIGS. 7A and 7B are views each illustrating a frame type MB and a field type MB for the video having a little amount of motion in case of the presence of binary shape information(mask)
Figure 8:
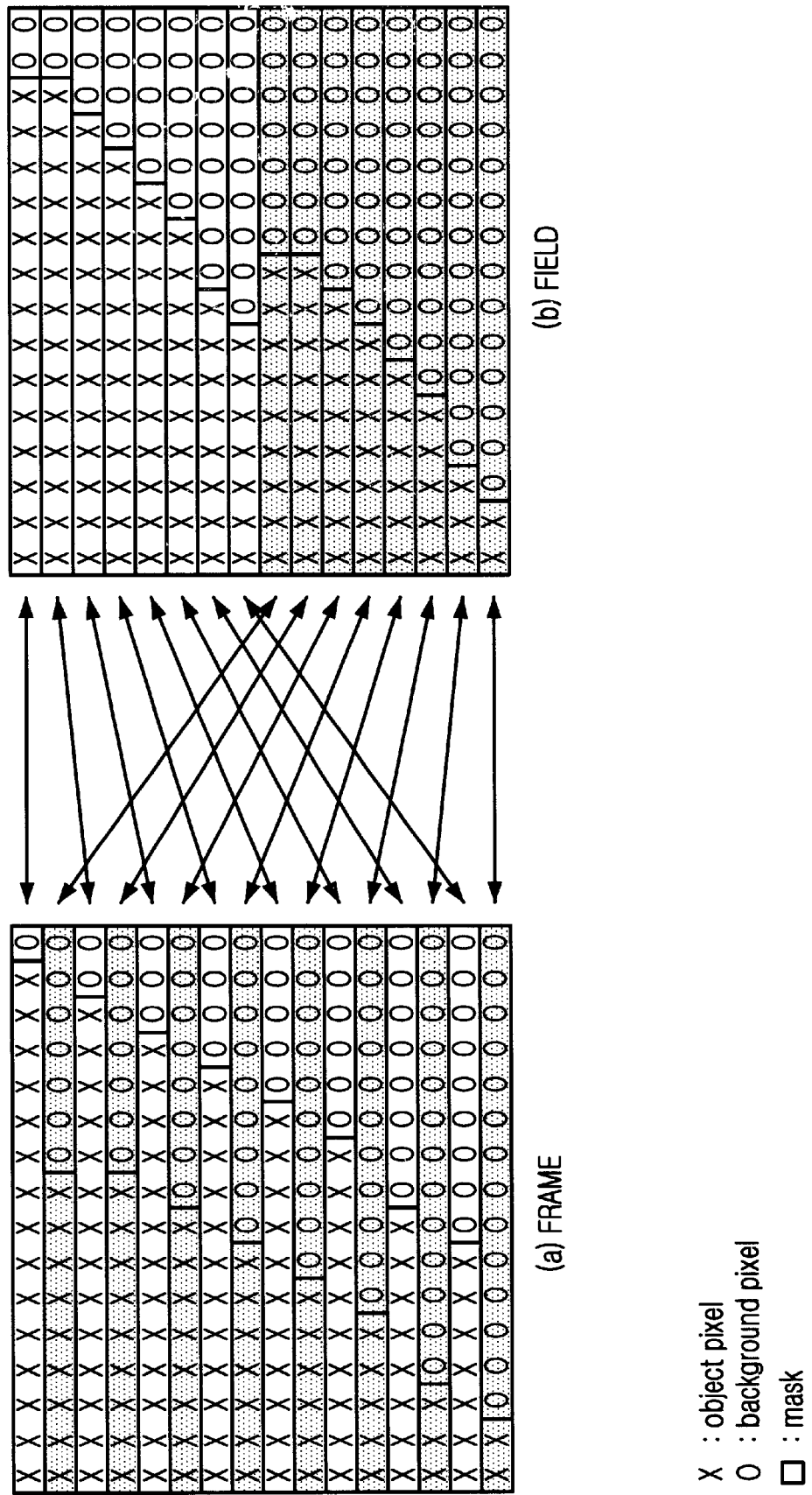
FIGS. 8A and 8B are views each illustrating a frame type MB and a field type MB for the video having a large amount of motion in case of the presence of binary shape information(mask)

The information of the texture motion vector extracting unit 19 is inputted from the motion estimating unit 12 of FIG. 1, and a texture frame/field prediction determining unit 20 and the texture motion vector order determining unit 21 are a part of the motion compensating unit 13 of FIG. 1. In the preferred embodiment of the present invention, the texture motion vector is transmitted to the shape information coding unit 11 of FIG. 1, which is not shown in FIG. 1. In more detail, the shape information frame/field prediction mode determining unit 121 within the shape information motion estimating unit 100 inputs the frame/field motion prediction mode and the motion vector of the shape information adjacent thereto to thereby determine whether the shape information BAB adjacent to the current BAB is the frame type or the field type. The adjacent shape information motion vector memory 122 outputs motion vectors MVs1, MVs2 and MVs3 of the shape information BAB adjacent to the current BAB previously stored to the shape information frame/field prediction mode determining unit 121. The shape information motion vector prediction value order determining unit 123 inputs the information on whether the shape information BAB adjacent to the current BAB is the frame type or the field type from the shape information frame/field prediction mode determining unit 121 to thereby determine the order of the shape information motion vectors MVs1, MVs2 and MVs3. On the other hand, the texture frame/field prediction determining unit 20 inputs the frame/field prediction flag and the motion vector of the adjacent texture MB to thereby determine whether the texture MB adjacent to the current MB is the frame type or the field type. The texture motion vector extracting unit 19 outputs motion vectors MV1, MV2 and MV3 of the texture MB adjacent to the current MB to the texture frame/field prediction determining unit 20. The texture motion vector order determining unit 21 inputs the information on whether the texture MB adjacent to the current MB is the frame type or the field type from the texture frame/field prediction determining unit 20 to thereby determine the order of the texture motion vector predictor. In addition, the shape information motion vector prediction value determining unit 124 finally determines the MVPs in accordance with the MVPs obtained in the motion vector prediction value for shape order determining unit 123 and the texture motion vector prediction value obtained in the texture motion vector prediction value order determining unit 21. In other words, if the presence/absence of the adjacent shape information motion vector is determined by priority order, the determined value is determined as the MVPs. However, if the adjacent shape information motion vector does not exist, the presence/absence of the adjacent texture motion vector is determined by priority order, the determined value is determined as the MVPs. Furthermore, the motion vector difference value for shape determining unit 125 performs an operation of the MVPs obtained in the shape information final motion vector prediction value determining unit 124 and the estimated shape information motion information MVs to thereby obtain the MVDs and transmits the MVDs to the shape information type determining unit 101 and the shape information motion compensating unit 103, respectively. In the interlaced scanning shape information coding, both the size 16×16 of one shape information motion vector MVs and the size 8×16 of two motion vectors can be transmitted. The transmitting type determining manner is selected when the value of SAD(Sum Absolute Difference) used in the motion estimation is small. Here, the BAB which transmits the size 16×16 of one shape information motion vector is called "frame predicted shape BAB" and the BAB which transmits the size 8×16 of two shape information motion vectors is called "field predicted shape BAB". Various kinds of motion vector prediction value for shape MVPs determining methods are needed depending upon as to whether the current shape BAB is the frame or field predicted mode BAB and the adjacent shape BAB and texture MB are the frame or field predicted mode. Basically, if the current shape BAB is the frame prediction mode BAB, the frame predicted BAB among the adjacent shape BABs is preceded and the frame predicted MB among the adjacent texture MBs is preceded. At this time, the motion vectors of the shape BAB precede the motion vectors of the texture MB. Similarly, in the case where the current shape BAB is the field predicted BAB, the field predicted BAB among the shape BABs is preceded and the field predicted MB among the texture MBs is preceded. At this time, the motion vectors of the shape BAB precede the motion vectors of the texture MB.

FIGS. 12A to 15B are reference views illustrating a determining process of the MVPs, in which the current shape BAB is the field predicted BAB and the adjacent BABs thereto are frame predicted BABs. FIGS. 12A, 13A, 14A and 15A show the shape information motion vectors, and FIGS. 12B, 13B, 14B and 15B show the texture motion vectors. The current shape BAB is the field predicted BAB having the size 8×16 of two motion vectors and the adjacent BABs are the frame predicted BAB having the size 16×16 of one motion vector (Case 1). The adjacent shape information motion vectors MVs1, MVs2 and MVs3 are the frame predicted BAB, and if one or more field predicted MB exists in the texture motion vectors MV1, MV2 and MV3, the order of the shape information motion vectors is not changed and the motion vector of the field predicted texture MB precedes the motion vector of the frame predicted texture MB.

At this time, the MVPs is obtained in order of MVs1, MVs2, MVs3, MV1, MV2 and MV3, without any change, in FIGS. 12A and 12B. However, in the texture motion vectors in FIGS. 13A and 13B, the MVPs of a first field motion vector MVsf1 of the current shape BAB is obtained in order of MVs1, MVs2, MVs3, MVsf1, MV2 and MV3, and the MVPs of a second field motion vector MVsf2 of the current shape BAB is obtained in order of MVs1, MVs2, MVs3, MVsf2, MV2 and MV3. At this time, the MV1f1 and MV1f2 of the MVPs are replaced with a value Div2Adj (MV1f1+MV1f2) which is obtained by adding MV1f1 and MV1f2, dividing the added result into 2, and adjusting the divided result by an integer value. The method of obtaining the value Div2Adj(MV1f1+MV1f2) is various as follows: firstly, the MV1f1 and MV1f2 are added, the added value is divided into 2, and the divided value is changed to a carry value by an integer value; secondly, the MV1f1 and MV1f2 are added, the added value is divided into 2, and the divided value is changed to a chopping value by an integer value; finally, the MV1f1 and MV1f2 are added, the added value is divided into 2, and the divided value is changed to a selective carry/chopping value by calculation with a peripheral value by an integer value. Moreover, the value Div2Adj (MV2f1+MV2f2) can be replaced with a value Div2Round (MV2f1+MV2f2) which is used when the texture motion estimation is performed in the MPEG-4 Visual CD.

The MVPs of the first field motion vector MVsf1 in FIGS. 14A and 14B is obtained in order of MVs1, MVs2, MVs3, MV2f1, MV1 and MV3. At this time, the order of MV2f1 and MV2f2 for obtaining the MVPs is replaced with a value Div2Adj(MV2f1+MV2f2). Since the current shape BAB is the field predicted BAB, the motion vector of the field predicted texture MB is preceded, so that the original order of MVs1, MVs2, MVs3, MV1, MV2f1, and MV3 is changed to the order of MVs1, MVs2, MVs3, MV2f1, MV1 and MV3.

The MVPs of the first field motion vector MVsf1 in FIGS. 15A and 15B is obtained in order of MVs1, MVs2, MVs3, MV3f1, MV1 and MV2 and the MVPs of the second field motion vector MVsf2 of the current shape BAB is obtained in order of MVs1, MVs2, MVs3, MV3f2, MV1 and MV2. At this time, the order of MV3f1 and MV3f2 for obtaining the MVPs is replaced with a value Div2Adj(MV3f1+MV3f2). Since the adjacent distance is long and the value Div2Adj (MV3f1+MV3f2) is changed from the field predicted BAB to the frame predicted BAB, and also as the BAB changes two vectors to one vector, the value Div2Adj(MV3f1+MV3f2) can be placed in the next order of the MVs1 or MVs2.

FIGS. 16A to 20B are reference views illustrating a determining process of the MVPs, in which the current shape BAB in the interlaced scanning shape information coding is the frame predicted BAB and one or more among the adjacent BABs thereto is the field predicted BAB. FIGS. 16A, 17A, 18A, 19A and 20A show the shape information motion vectors, and FIGS. 16B, 17B, 18B, 19B and 20B show the texture motion vectors. The current shape BAB is the frame predicted BAB having the size 16×16 of one motion vector and one or more of the adjacent BABs is the field predicted BAB having the size 8×16 of two motion vectors(Case 2). If one or more of field predicted BAB among the adjacent shape information motion vectors MVs1, MVs2 and MVs3 exists, the motion vector Div2Adj (MVsf1+MVsif2) of the adjacent frame predicted shape information BAB precedes the motion vector of the adjacent field predicted shape information BAB. However, in the process of determining the order for obtaining the MVPs with the value Div2Adj(MVsf1+MVsf2), since the value Div2Adj(MVsf1+MVsf2) is changed from the field predicted BAB having two motion vectors to the frame predicted BAB having one motion vector, the shape information BAB can be considered as the frame predicted BAB.

In FIGS. 16A and 16B, the MVPs of the motion vectors MVs is obtained in order of MVs1, Div2Adj(MVs2f1+

MVs2f2), MVs3, MV1, MV2 and MV3. In FIGS. 17A and 17B, the MVPs of the motion vectors MVs is obtained in order of MVs1, Div2Adj(MVs2f1+MVs2f2), MVs3, MV2, Div2Adj (MV1f1+MV1f2) and MV3. In FIGS. 18A and 18B, the MVPs of the motion vectors MVs is obtained in order of MVs1, Div2Adj(MVs2f1+MVs2f2), MVs3, MV1, Div2Adj (MV2f1+MV2f2) and MV3. In FIGS. 19A and 19B, the MVPs of the motion vectors MVs is obtained in order of MVs2, Div2Adj(MVs1f1+MVs1f2), MVs3, MV2, Div2Adj (MV1f1+MV1f2) and MV3. In FIGS. 20A and 20B, the MVPs of the motion vectors MVs is obtained in order of Div2Adj(MVs1f1+MVs1f2), MVs2, MVs3, Div2Adj (MV2f1+MV2f2), MV1 and MV3.

Figure 21:
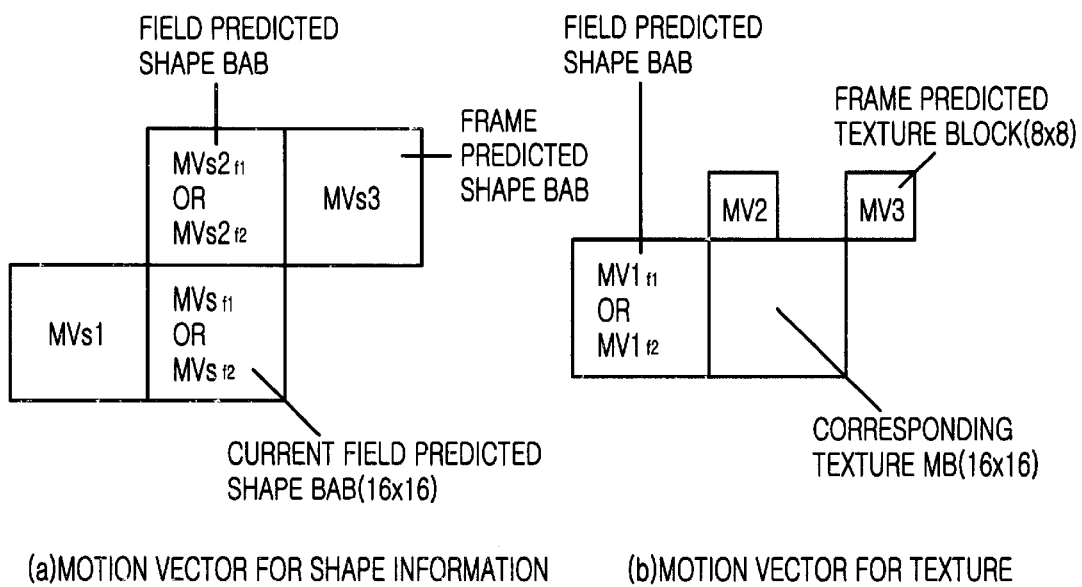
Figure 22:
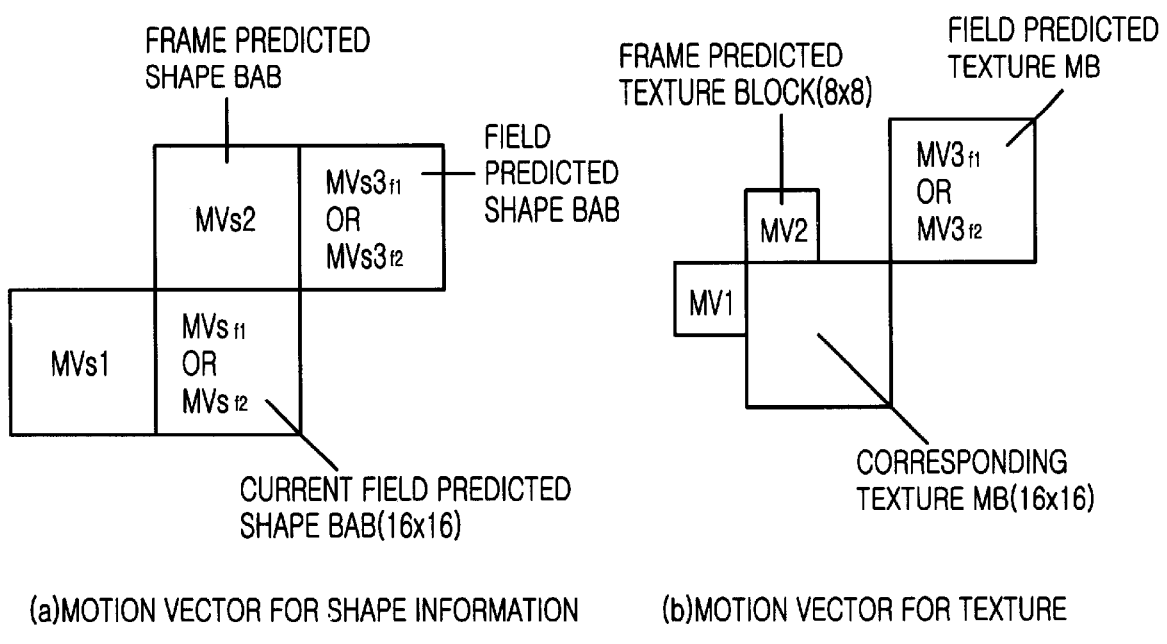

FIGS. 21A to 22B are reference views illustrating a determining process of the MVPs, in which FIGS. 21A and 22A show the shape information motion vectors and FIGS. 21B and 22B show the texture motion vectors. The current shape BAB is the field predicted BAB having the size 8×16 of two motion vectors and one or more of the adjacent BABs is the field predicted BAB having the size 8×16 of two motion vectors (Case 3). If one or more of field predicted BAB among the adjacent shape information motion vectors MVs1, MVs2 and MVs3 exists and one or more of field predicted MB among the texture motion vectors MV1, MV2 and MV3 exists, the motion vector of the field predicted MB precedes the motion vector of the frame predicted MB.

In FIGS. 21A and 21B, the MVPs of the first field motion vector MVsf1 is obtained in order of MVs2f1, MVs1, MVs3, MV1f1, MV2 and MV3 and the MVPs of the second field motion vector MVsf2 is obtained in order of MVs2f2, MVs1, MVs3, MV1f2, MV2 and MV3. At this time, the order of MVs2f1 and MVs2f2 for obtaining the MVPs is replaced with the value Div2Adj(MVs2f1+MVs2f2). In the same manner as the above, the order of MV1f1 and MV1f2 for obtaining the MVPs is replaced with the value Div2Adj(MV1f1+MV1f2).

In FIGS. 22A and 22B, the MVPs of the first field motion vector MVsf1 is obtained in order of MVs3f1, MVs1, MVs2, MV3f1, MV1 and MV2 and the MVPs of the second field motion vector MVsf2 is obtained in order of MVs3f2, MVs1, MVs2, MV3f2, MV1 and MV2. However, in the process of determining the order for obtaining the MVPs with the value Div2Adj(MVsf1+MVsif2), since the value Div2Adj (MVsif1+MVsf2) is changed from the field predicted BAB having two motion vectors to the frame predicted BAB having one motion vector, the shape BAB can be considered as the frame predicted BAB.

In all of the MVPs determining methods as mentioned above, in the case where the current BAB and the MVs3 are the field predicted BABs, when the field motion vector MVs3f1 or MVs3f2 is determined as the MVPs, the MVs3 is in a priority order in the shape information motion vectors MVs1, MVs2 and MVs3. However, when the two field motion vectors are changed to one motion vector Div2Adj (MVs3f1+MVs3f2), since the changed motion vector is considered as the frame predicted BAB, the MVs3 is in a last order in the shape information motion vectors MVs1, MVs2 and MVs3. The texture motion vector MV3 is executed in the same manner as the shape information motion vector MVs3.

Next, the binary shape information type determining unit 101 determines a BAB type(BAB_type) as the additional information(overhead) of the shape information by using the motion information obtained in the shape information motion estimating unit 100. The determined BAB_type information is coded and transmitted to the decoding unit. As noted above, the BAB_type is divided into 7 types such as ALL_0, ALL_255, MVDs=0&&No_update, MVDs!= 0&&No_update, IntraCAE, MVDs=0&&InterCAE, and MVDs!=0&&InterCAE.

On the other hand, in the case where the BAB_type is not equal to ALL_0, ALL_255, or MVDs=0&&No_update in which the coding is not needed, the coding mode determining unit 102 determines whether effective compression coding is the field mode shape information coding or the frame mode shape information coding to thereby perform the interlaced scanning shape information coding. Determination of the coding mode is dependent upon an amount of the motion of the shape information. And, the amount of the motion within the BAB is determined by the above equation (1). If the coding mode is determined as the field mode coding, the field additional information determining unit 104 determines the additional information on the field discrimination, which is coded and transmitted to the decoding unit. One field of the determined BAB_type_field is No_update and the type information for the other field thereof is comprised of IntraCAE, InterCAE and No_update. The information of top_or_bottom indicates the corresponding information of the BAB_type_field. The BAB_data of the one field is coded and outputted. Furthermore, the shape information motion compensating unit 103 compensates the motion of the inputted shape information in accordance with the coding mode flag obtained in the coding mode determining unit 102 and transmits the compensated binary shape information to the shape information coding unit 105.

After the coding mode determining process, the shape information coding unit 105 performs the corresponding coding in accordance with the determined coding mode. The shape information coding unit 105 is comprised of a frame coding unit 105a for coding the compensated binary shape information in the frame mode, if the coding mode information obtained in the shape information coding mode determining unit 102 is the frame mode information, and a field coding unit 105b for coding the binary shape information in the field mode, if the coding mode information obtained in the shape information coding mode determining unit 102 is the field mode information. If the determined coding mode in the coding mode determining unit 102 is the frame mode, the frame coding unit 105a within the shape information coding unit 105 performs the CAE operation of the shape information in the frame BAB unit (16×16). On the other hand, if the determined coding mode in the coding mode determining unit 102 is the field mode, the field coding unit 105b within the shape information coding unit 105 divides the BAB into the top and bottom field type BABs (8×16) and performs the CAE operation of the field type BABs.

FIG. 23 is a block diagram illustrating configuration of a shape information coding device for interlaced scanning video according to another embodiment of the present invention. In this figure, the shape information coding device includes: a shape information motion estimating unit 131 for estimating motion vector MVs in a BAB unit from binary shape information inputted; a shape information type determining unit 132 for determining a type of the BAB by the motion information obtained from the shape information motion estimating unit 131; a shape information coding mode determining unit 133 for determining a coding mode of the shape information in accordance with the type mode of the BAB obtained in the shape information type determining unit 132; a shape information motion compensating unit 138 for compensating the inputted shape information motion in accordance with the shape information coding mode obtained in the shape information coding mode determining unit 133; a field additional information determining unit 134 for determining additional information for field discrimination in accordance with the coding mode information obtained in the shape information coding mode determining unit 133 and the type information of the BAB obtained in the shape information type determining unit 132; a frame coding unit 135 for coding the compensated binary shape information in the frame unit, if the coding mode information obtained in the shape information coding mode determining unit 133 is the frame mode information; a field unit motion estimating unit 136 for estimating the motion vector from the binary shape information in the field unit, if the coding mode information obtained in the shape information coding mode determining unit 133 is the field mode information; and a field coding unit 137 for coding the compensated binary shape information in the field unit in accordance with the motion information obtained in the field unit motion estimating unit 136. In the preferred another embodiment of the present invention, in the case where the coding mode is determined as the frame mode, the shape information motion estimating unit 131 estimates the motion vector in 16×16 BAB unit from the previous reference picture, determines the order of MVPs and calculates an MVDs as a difference value between a final MVPs and the estimated shape information motion vector to thereby output the MVDs to the shape information type determining unit 132 and the shape information motion compensating unit 103, respectively. The shape information type determining unit 132 determines the BAB from the previous frame with the inputted motion information and then determines the BAB type BAB_type from the difference between the determined BAB and the current BAB. The determined BAB_type is coded and transmitted to the decoding unit. Moreover, the shape information motion compensating unit 138 compensates the inputted shape information motion in accordance with the shape information coding mode obtained in the shape information coding mode determining unit 133. The compensated BAB is inputted and coded to the frame coding unit 135 and the field coding unit 137, respectively.

Meanwhile, the shape information coding mode determining unit 133 inputs the type mode of the BAB obtained in the shape information type determining unit 132 to thereby determine as to whether a frame mode CAE operation or a field mode CAE operation is performed in accordance with an amount of motion of the shape information. In the coding mode determining process, if the field coding mode is selected, the field additional information determining unit 134 determines whether any field is coded and codes additional information for field discrimination. The coded field additional information is transmitted to the decoding unit. One field of the determined BAB_type_field is No_update and the type information for the other field thereof is comprised of IntraCAE, InterCAE and No_update. The information of top_or_bottom indicates the corresponding information of the BAB_type_field. The BAB_data of the one field is coded and outputted. The frame coding unit 135 performs the CAE operation for the BAB, if the coding mode information obtained in the shape information coding mode determining unit 133 is the frame mode information. The shape information coded in the frame unit is transmitted to the decoding unit. If the coding mode information obtained in the shape information coding mode determining unit 133 is the field mode information, the field motion estimating unit 136 estimates the motion vector in the field unit(8×16) in the reference picture of the previous frame. The estimated motion vector value is transmitted to the field coding unit 137 which divides the BAB into the field type BAB(8×16) having the top and bottom fields and performs the CAE operation for each field type BAB.

As discussed above, a shape information coding device for interlaced scanning video and method therefor according to the preferred embodiment of the present invention can detect an amount of motion of object video, on coding of interlaced scanning video, select field or frame coding mode in accordance with the detected result, perform motion compensation in a field unit if the selected coding mode is the field mode, and perform motion compensation in a frame unit if the selected coding mode is the frame mode, whereby the number of shape information coding bits can be reduced upon coding of the field unit to thereby increase coding efficiency of the shape information for the interlaced scanning video.

In addition, a shape information coding device for interlaced scanning video and method therefor according to the preferred embodiment of the present invention can construct one frame with two fields, upon coding of shape information for the interlaced scanning video, and then determine an order of MVPs in an efficient manner to thereby improve coding gain.

Moreover, a shape information coding device for interlaced scanning video and method therefor according to the preferred embodiment of the present invention can construct one frame with two fields, upon coding of shape information for the interlaced scanning video, and then transmit the block type information for the one field of the two fields, without performing an CAE operation, whereby an amount of data to be transmitted is decreased thus to improve coding efficiency.

It will be apparent to those skilled in the art that various modifications and variations can be made in a shape information coding device for interlaced scanning video and method therefor of the present invention without departing from the spirit or scope of the invention. Thus, it is intended that the present invention cover the modifications and variations of this invention provided they come within the scope of the appended claims and their equivalents.

What is claimed is:

1. A shape information coding method for interlaced scanning video, said method comprising the steps of:

(a) estimating motion of a predetermined size of binary alpha block inputted, determining a shape information motion prediction mode and a motion vector predictor for shape, based upon the estimated motion information, and performing an operation for the determined motion vector predictor for shape and the estimated motion information to calculate a motion vector difference for shape;

(b) determining a type of the binary alpha block in accordance with the motion information in the motion estimating step (a);

(c) comparing a first value obtained by accumulating an error between each pixel of a frame and the pixel adjacent thereto upon the frame of the binary alpha block with a second value obtained by accumulating an error between each pixel of a field and the pixel adjacent thereto upon the field of the binary alpha block to thereby determine a coding mode in accordance with the compared result;

(d) compensating the motion of the shape information in accordance with the determined shape information motion prediction mode; and (e) coding the motion-compensated shape information in the determined coding mode.

2. The method according to claim 1, wherein said step (a) of estimating the motion of the binary alpha block comprises the steps of selecting, if current shape binary alpha block is a frame predicted binary alpha block, the motion vector predictor for shape in a priority order of the frame predicted binary alpha block among adjacent shape binary alpha blocks to the current shape binary alpha block, selecting the motion vector predictor for shape in a priority order of a frame predicted macroblock among texture macroblocks, and selecting the motion vector predictor for shape in a priority order of motion vectors of the shape binary alpha block to the motion vector of the texture macroblock.

3. The method according to claim 1, wherein said step (a) of estimating the motion of the binary alpha block comprises the steps of selecting, if current shape binary alpha block is a field predicted binary alpha block, the motion vector predictor for shape in a priority order of the field predicted binary alpha block among adjacent shape binary alpha blocks to the current shape binary alpha block, selecting the motion vector predictor for shape in a priority order of a field predicted macroblock among the field predicted macroblock adjacent to a texture macroblock, and selecting the motion vector predictor for shape in a priority order of motion vectors of the shape binary alpha block to the motion vector of the texture macroblock.

4. The method according to claim 1, wherein said step (a) of determining said motion prediction mode comprises the steps of comparing an error value upon the motion estimation of the size of 16×16 with an error value upon the motion estimation of the size of 8×16 and determining the motion prediction mode to a mode having a small error value of the two error values.

5. The method according to claim 1, wherein said step (a) of determining said motion vector predictor for shape comprises the steps of: applying, if the current shape binary alpha block is the field predicted binary alpha block having the size 8×16 of two motion vectors or the frame predicted binary alpha block having the size 16×16 of one motion vector and in the case where the field predicted binary alpha block/macroblock having the size 8×16 of two motion vectors in adjacent shape binary alpha blocks(MVs1, MVs2 and MVs3) and the texture macroblocks(MV1, MV2 and MV3) exist, values Div2Adj(MVsif1+MVsf2) and Div2Adj (MVif1+MVif2) (wherein, i=1, 2, 3) to the field predicted binary alpha block/macroblock having the size 8×16 of two motion vectors; and changing the two motion vectors to one vector with a value obtained by adding the MV1f1 and MV1f2, dividing the added value into 2 and rounding off the divided value by an integer value to thereby determine the motion vector predictor for shape.

6. The method according to claim 1, wherein said step (a) of determining said motion vector predictor for shape comprises the steps of: applying, if the current shape binary alpha block is the field predicted binary alpha block having the size 8×16 of two motion vectors or the frame predicted binary alpha block having the size 16×16 of one motion vector and in the case where the field predicted binary alpha block/macroblock having the size 8×16 of two motion vectors in adjacent shape binary alpha blocks(MVs1, MVs2 and MVs3) and the texture macroblocks(MV1, MV2 and MV3) exist, values Div2Adj(MVsif1+MVsif2) and Div2Adj (MVif1+MVif2) (wherein, i=1,2,3) to the field predicted binary alpha block/macroblock having the size 8×16 of two motion vectors; and changing the two motion vectors to one vector with a value obtained by adding the MV1f1 and MV1f2, dividing the added value into 2 and carrying the divided value by an integer value to thereby determine the motion vector predictor for shape.

7. The method according to claim 1, wherein said step (a) of determining said motion vector predictor for shape comprises the steps of: applying, if the current shape binary alpha block is the field predicted binary alpha block having the size 8×16 of two motion vectors or the frame predicted binary alpha block having the size 16×16 of one motion vector and in the case where the field predicted binary alpha block/macroblock having the size 8×16 of two motion vectors in adjacent shape binary alpha blocks(MVs1, MVs2 and MVs3) and the texture macroblocks(MV1, MV2 and MV3) exist, values Div2Adj(MVsif1+MVsif2) and Div2Adj (MVif1+MVif2) (wherein, i=1,2,3) to the field predicted binary alpha block/macroblock having the size 8×16 of two motion vectors; and changing the two motion vectors to one vector with a value obtained by adding the MV1f1 and MV1f2, dividing the added value into 2 and chopping the divided value by an integer value to thereby determine the motion vector predictor for shape.

8. The method according to claim 1, wherein said step (e) of coding the shape information comprises the steps of performing frame prediction and field prediction, if the determined coding mode is the field mode, to thereby determine the motion prediction mode, based upon an error amount between the frame/field prediction and performing the shape information coding in the field unit.

9. The method according to claim 1, wherein said step (e) of coding the shape information comprises the steps of performing the motion estimation in the frame unit and the motion estimation in the field unit, determining the motion prediction mode of the binary alpha block, and performing frame/field motion compensation, based upon the determined motion prediction mode.

10. A shape information coding method for interlaced scanning video, comprising the steps of:

(a) comparing a first value obtained by accumulating an error between each pixel of a frame and the pixel adjacent thereto upon the frame of a predetermined size of binary alpha block inputted with a second value obtained by accumulating an error between each pixel of a field and the pixel adjacent thereto upon the field of the binary alpha block to thereby determine a coding mode in accordance with the compared result;

(b) estimating motion of the predetermined size of binary alpha block inputted by utilizing the determined coding mode as a motion prediction mode, determining a shape information motion prediction mode and a motion vector predictor for shape, based upon the estimated motion information, and performing an operation for the determined motion vector predictor for shape and the estimated motion information to calculate a motion vector difference value for shape;

(c) determining a type of the binary alpha block in accordance with the motion information in the motion estimating step;

(d) compensating the motion of the shape information in accordance with the determined shape information motion prediction mode; and (e) coding the motion-compensated shape information in the determined coding mode.

11. A shape information coding device for interlaced scanning video, said device comprising:

a shape information motion estimating means for estimating motion of a predetermined size of binary alpha block inputted, determining a shape information motion prediction mode and a motion vector predictor for shape, based upon the estimated motion information, and performing an operation for the determined motion vector predictor for shape and the estimated motion information to calculate a motion vector difference value for shape;

a shape information type determining means for determining a type of the binary alpha block in accordance with the motion information in said shape information motion estimating means;

a shape information coding mode determining means for determining a coding mode of the shape information in accordance with an amount of variation of the motion of the binary alpha block;

a shape information motion compensating means for compensating the motion of the shape information in accordance with the determined shape information motion prediction mode;

a field additional information determining means for determining a field block type and additional information on field discrimination in accordance with the coding mode information obtained in said shape information coding mode determining means and the type of binary alpha block obtained in said shape information type determining means and coding the determined additional information; and a shape information coding means for coding the binary shape information obtained in said shape information motion compensating means in the frame unit or field unit in accordance with the determined coding mode in said shape information coding mode determining means.

12. The device according to claim 11, wherein said shape information motion estimating means divides one binary alpha block into a frame predicted block having a size 16×16 of one motion vector and a field predicted block having a size 8×16 of two motion vectors to thereby estimate the motion vector of the shape information and transmits the shape information prediction mode.

13. The device according to claim 11, wherein said shape information motion estimating means is comprised of:

a shape information frame/field prediction mode determining unit for inputting frame/field prediction flag and motion information of an adjacent shape binary alpha block to thereby determine whether the prediction mode of the shape binary alpha block adjacent to the current binary alpha block is the frame predicted mode or the field predicted mode;

an adjacent shape information motion vector extracting unit for outputting motion vector of the shape binary alpha block adjacent to the current binary alpha block to said shape information frame/field prediction mode determining unit;

a motion vector predictor for shape order determining unit for inputting the information on whether the shape binary alpha block adjacent to the current binary alpha block is in the frame predicted mode or the field predicted mode from said shape information frame/field prediction mode determining unit to thereby determine an order of the motion vector predictor for shape;

a final motion vector predictor for shape determining unit for determining a final motion vector predictor for shape with said motion vector predictor for shape order determining unit and a texture motion vector predictor obtained in a texture motion vector predictor order determining unit; and a motion vector difference for shape determining unit for determining a motion vector difference for shape from a difference value between the final motion vector predictor for shape obtained in said final motion vector predictor for shape determining unit and the estimated shape information motion information.

14. The device according to claim 13, wherein said shape information motion estimating means is further comprised of:

a texture frame/field prediction determining unit for inputting the frame/field prediction flag and the motion vector of the adjacent texture macroblock to thereby determine whether the texture macroblock adjacent to the current macroblock is the frame type or the field type;

a texture motion vector extracting unit for outputting motion vectors of the texture macroblock adjacent to the current macroblock to said texture frame/field prediction determining unit; and a texture motion vector order determining unit for inputting the information on whether the texture macroblock adjacent to the current macroblock is the frame type or the field type from said texture frame/field prediction determining unit to thereby determine the order of the texture motion vector predictor.

15. The device according to claim 11, wherein said shape information coding means is comprised of: a frame coding unit for coding the compensated binary shape information in the frame type block unit, if the coding mode information obtained in said shape information coding mode determining unit is the frame mode information; and a field coding unit for coding the compensated binary shape information in the field type block unit, if the coding mode information obtained in said shape information coding mode determining unit is the field mode information.

16. The device according to claim 11, wherein said field additional information determining means is comprised of: a field block type determining unit for a field block type in accordance with the coding mode information obtained in said shape information coding mode determining unit and the mode information obtained in said shape information type determining unit; and a field additional information coding unit for coding the information indicative of the determined field block type and coding the data of the binary alpha block of one field to thereby output the coded data.

17. A shape information coding device for interlaced scanning video, said device comprising:

a shape information coding mode determining means for determining a coding mode of shape information in accordance with an amount of variation of motion of a binary alpha block inputted;

a shape information motion estimating means for estimating motion vector in a frame unit from binary shape information inputted, if the determined coding mode is a frame mode;

a shape information type determining means for determining a type of the binary alpha block by the motion information obtained from said shape information motion estimating means;

a shape information motion compensating means for compensating motion of the inputted shape information in accordance with the shape information coding mode obtained in said shape information coding mode determining means;

a field additional information determining means for determining additional information for field discrimination if the determined coding mode is the field mode;

a frame coding means for coding the compensated binary shape information in the frame type block unit, if the coding mode information obtained in said shape information coding mode determining means is the frame mode information;

a field unit motion estimating means for estimating the motion vector from the binary shape information in the field unit, if the coding mode information obtained in said shape information coding mode determining means is the field mode information; and a field coding means for coding the compensated binary shape information in the field unit in accordance with the motion information obtained in said field unit motion estimating means.

* * * * *